(12) United States Patent
Burton et al.

(10) Patent No.: US 12,380,437 B1
(45) Date of Patent: Aug. 5, 2025

(54) SERVER-TO-DEVICE SECURE DATA EXCHANGE TRANSACTIONS

(71) Applicant: Wells Fargo Bank, N.A., San Francisco, CA (US)

(72) Inventors: Anthony Burton, Charlotte, CA (US); Benjamin Soccorsy, Larkspur, CA (US); Jim Stahley, San Francisco, CA (US); Valeria C. Jones, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 131 days.

(21) Appl. No.: 17/969,797

(22) Filed: Oct. 20, 2022

Related U.S. Application Data

(63) Continuation of application No. 17/676,328, filed on Feb. 21, 2022, now Pat. No. 12,211,033.
(Continued)

(51) Int. Cl.
| | |
|---|---|
| *G06Q 20/38* | (2012.01) |
| *G06F 21/34* | (2013.01) |
| *G06F 21/44* | (2013.01) |
| *G06Q 20/36* | (2012.01) |

(Continued)

(52) U.S. Cl.
CPC ....... *G06Q 20/38215* (2013.01); *G06F 21/44* (2013.01); *G06Q 20/36* (2013.01);
(Continued)

(58) Field of Classification Search
CPC .... G06F 21/44; G06Q 20/401; G06Q 20/382; G06Q 20/409
See application file for complete search history.

(56) References Cited

U.S. PATENT DOCUMENTS

| | | | |
|---|---|---|---|
| 5,892,900 A | * | 4/1999 | Ginter ............... H04L 63/20 726/26 |
| 6,088,700 A | | 7/2000 | Larsen et al. |

(Continued)

FOREIGN PATENT DOCUMENTS

| | | |
|---|---|---|
| CN | 102171716 | 8/2011 |
| CN | 102479180 | 5/2012 |

(Continued)

OTHER PUBLICATIONS

Akram et al "Digital trust-trusted computing and beyond: A position paper." 2014 IEEE 13th International Conference on Trust, Security and Privacy in Computing and Communications. IEEE, 2014, pp. 884-892 (Year: 2014).

(Continued)

*Primary Examiner* — Steven S Kim
(74) *Attorney, Agent, or Firm* — Foley & Lardner LLP

(57) ABSTRACT

Various embodiments described herein relate to systems, methods, and non-transitory computer-readable media structured to perform server-to-device secure data exchange using a device access token. In an embodiment, a smart device receives, from a requestor entity provided to the smart device, an account data provisioning request for an account. Based on the account data provisioning request, an account identifier for the account is determined. In some arrangements, the account identifier comprises or is associated with a device access token. Based on the device access token, a data element associated with the account is determined. In some embodiments, the data element is accessible to the requestor entity only if it is not access-restricted based on the device access token. Based on the data element, an executable graphic rendering instruction is generated. The executable graphic rendering instruction is executed, which includes generating and displaying, on a user interface of the (Continued)

smart device, a dynamic account status indicator relating to the account.

12 Claims, 10 Drawing Sheets

Related U.S. Application Data

(60) Provisional application No. 63/152,581, filed on Feb. 23, 2021, provisional application No. 63/181,861, filed on Apr. 29, 2021.

(51) Int. Cl.
*G06Q 20/40* (2012.01)
*H04L 67/133* (2022.01)

(52) U.S. Cl.
CPC ......... *G06Q 20/401* (2013.01); *G06Q 20/382* (2013.01); *G06Q 20/409* (2013.01); *H04L 67/133* (2022.05)

(56) References Cited

U.S. PATENT DOCUMENTS

| | | |
|---|---|---|
| 6,922,843 B1 | 7/2005 | Herrington et al. |
| 7,062,567 B2 | 6/2006 | Benitez et al. |
| 7,095,855 B1 | 8/2006 | Collins |
| 7,653,592 B1 | 1/2010 | Flaxman et al. |
| 7,886,963 B1 | 2/2011 | Barth |
| 7,925,579 B1 | 4/2011 | Flaxman et al. |
| 8,191,769 B1 | 6/2012 | Barth |
| 8,255,991 B1 | 8/2012 | Hackborn et al. |
| 8,359,070 B1 | 1/2013 | Zhu |
| 8,423,451 B1 | 4/2013 | Flaxman et al. |
| 8,489,498 B1 | 7/2013 | Flaxman et al. |
| 8,511,545 B1 | 8/2013 | Barth |
| 8,898,743 B1 | 11/2014 | Kowalik et al. |
| 9,246,921 B1 | 1/2016 | Vlaminck et al. |
| 9,313,203 B2 | 4/2016 | Adler et al. |
| 9,338,007 B1 | 5/2016 | Doshi |
| 9,426,836 B2 | 8/2016 | Johnsson |
| 9,525,690 B2 | 12/2016 | Burgess et al. |
| 9,635,028 B2 | 4/2017 | Shepard et al. |
| 9,691,051 B2 | 6/2017 | Rexer et al. |
| 9,710,807 B2 | 7/2017 | Theurer et al. |
| 9,860,253 B2 | 1/2018 | Cairns |
| 9,996,825 B1 | 6/2018 | Casey et al. |
| 10,003,587 B2 | 6/2018 | Kobayashi |
| 10,009,773 B2 | 6/2018 | Smith et al. |
| 10,025,933 B2 | 7/2018 | Wadley et al. |
| 10,097,552 B2 | 10/2018 | Wadley et al. |
| 10,380,619 B2 | 8/2019 | Pontious |
| 10,437,610 B2 | 10/2019 | Wadley et al. |
| 10,469,484 B1 | 11/2019 | Chen et al. |
| 10,635,692 B2 | 4/2020 | Eigner et al. |
| 10,679,271 B2 | 6/2020 | Singh et al. |
| 10,740,372 B2 | 8/2020 | Matsumoto |
| 10,909,524 B2 | 2/2021 | Van Os et al. |
| 10,915,886 B1 | 2/2021 | Anderson |
| 10,949,608 B2 | 3/2021 | Terra et al. |
| 10,992,679 B1* | 4/2021 | Fakhraie .............. H04L 63/102 |
| 11,055,593 B1 | 7/2021 | Sherif |
| 11,106,515 B1 | 8/2021 | Fakhraie et al. |
| 11,615,402 B1* | 3/2023 | Pearce .............. G06Q 20/3674 |
| | | 705/41 |
| 11,928,236 B1 | 3/2024 | Fakhraie et al. |
| 2002/0095571 A1 | 7/2002 | Bradee |
| 2002/0173295 A1 | 11/2002 | Nykanen et al. |
| 2003/0112306 A1 | 6/2003 | Simpson et al. |
| 2005/0086176 A1 | 4/2005 | Dahlgren et al. |
| 2005/0198563 A1 | 9/2005 | Kristjansson |
| 2005/0289114 A1 | 12/2005 | Bellamy |
| 2005/0289348 A1 | 12/2005 | Joy et al. |
| 2006/0150247 A1 | 7/2006 | Gafken |
| 2008/0098292 A1 | 4/2008 | Embry |
| 2008/0133274 A1 | 6/2008 | Warner |
| 2008/0134297 A1 | 6/2008 | Clinick et al. |
| 2009/0055936 A1* | 2/2009 | Eberstaller .............. G06F 21/34 |
| | | 726/28 |
| 2009/0313630 A1 | 12/2009 | Hori |
| 2011/0078098 A1 | 3/2011 | Lapir et al. |
| 2011/0113473 A1 | 5/2011 | Corda et al. |
| 2011/0239270 A1 | 9/2011 | Sovio et al. |
| 2011/0271173 A1 | 11/2011 | Ait-Mokhtar et al. |
| 2012/0047162 A1* | 2/2012 | Guglietti ............. G06F 21/6227 |
| | | 707/769 |
| 2012/0290445 A1 | 11/2012 | Wilson et al. |
| 2012/0291102 A1 | 11/2012 | Cohen |
| 2012/0310760 A1 | 12/2012 | Phillips et al. |
| 2013/0024371 A1 | 1/2013 | Hariramani et al. |
| 2013/0085835 A1 | 4/2013 | Horowitz |
| 2013/0132854 A1 | 5/2013 | Raleigh et al. |
| 2013/0227652 A1 | 8/2013 | Choi et al. |
| 2013/0254660 A1 | 9/2013 | Fujioka |
| 2013/0346302 A1 | 12/2013 | Purves et al. |
| 2014/0059565 A1 | 2/2014 | Ko et al. |
| 2014/0067650 A1 | 3/2014 | Gardiner et al. |
| 2014/0122989 A1 | 5/2014 | Eigner et al. |
| 2014/0123057 A1 | 5/2014 | Eigner et al. |
| 2014/0215573 A1 | 7/2014 | Cepuran |
| 2014/0258828 A1 | 9/2014 | Lymer et al. |
| 2014/0344232 A1 | 11/2014 | Kludy |
| 2014/0351583 A1 | 11/2014 | Bettale et al. |
| 2014/0379801 A1* | 12/2014 | Gupta ................ H04N 21/4126 |
| | | 709/204 |
| 2015/0020777 A1 | 1/2015 | Carey et al. |
| 2015/0186871 A1 | 7/2015 | Laracey |
| 2015/0205777 A1 | 7/2015 | Campanelli et al. |
| 2015/0215305 A1 | 7/2015 | Wetzel et al. |
| 2015/0248393 A1 | 9/2015 | Watanabe |
| 2015/0281238 A1 | 10/2015 | Kumar et al. |
| 2015/0294406 A1 | 10/2015 | Dixon et al. |
| 2015/0339464 A1 | 11/2015 | Kode et al. |
| 2015/0373523 A1 | 12/2015 | Jeong et al. |
| 2016/0085609 A1 | 3/2016 | Lu et al. |
| 2016/0117659 A1 | 4/2016 | Bedier et al. |
| 2016/0191534 A1 | 6/2016 | Mallozzi |
| 2016/0210626 A1 | 7/2016 | Ortiz et al. |
| 2016/0364721 A1 | 12/2016 | Deliwala et al. |
| 2017/0012982 A1 | 1/2017 | Carter |
| 2017/0055109 A1 | 2/2017 | Van Nieuwenhuyze |
| 2017/0070527 A1* | 3/2017 | Bailey ............... G06F 16/9535 |
| 2017/0161973 A1 | 6/2017 | Katta et al. |
| 2017/0213212 A1 | 7/2017 | Dicker |
| 2017/0262891 A1 | 9/2017 | Green et al. |
| 2017/0344384 A1 | 11/2017 | Wadley et al. |
| 2017/0344745 A1 | 11/2017 | Wadley et al. |
| 2017/0346823 A1 | 11/2017 | Wadley et al. |
| 2018/0211055 A1 | 7/2018 | Balijepalli et al. |
| 2018/0213059 A1* | 7/2018 | Alsina .................... H04L 67/55 |
| 2018/0268399 A1 | 9/2018 | Spector et al. |
| 2018/0341650 A1 | 11/2018 | Faith et al. |
| 2018/0373396 A1 | 12/2018 | Mullen |
| 2019/0138698 A1 | 5/2019 | Qiu |
| 2019/0318122 A1 | 10/2019 | Hockey et al. |
| 2020/0034164 A1 | 1/2020 | Wadley et al. |
| 2020/0134714 A1 | 4/2020 | De Gaia et al. |
| 2020/0167760 A1 | 5/2020 | Makhotin |
| 2020/0356682 A1 | 11/2020 | Gu |
| 2020/0364720 A1 | 11/2020 | Lally et al. |
| 2020/0382328 A1 | 12/2020 | Bhattacharya |
| 2021/0075782 A1 | 3/2021 | Dunjic et al. |
| 2021/0118084 A1 | 4/2021 | Dharmar et al. |
| 2021/0126823 A1 | 4/2021 | Poess et al. |

FOREIGN PATENT DOCUMENTS

| | | |
|---|---|---|
| EP | 0 962 098 B1 | 12/1999 |
| RU | 2602789 C2 | 11/2016 |
| WO | WO-2017/116488 A1 | 7/2017 |

OTHER PUBLICATIONS

Pentland et al. "Towards an Internet of Trusted Data: A New Framework for Identity and Data Sharing" Aug. 2016, MIT Con-

(56) References Cited

OTHER PUBLICATIONS nection Science, Input to the Commission on Enhancing National Cybersecurity, pp. 1-19 (Year: 2016).

Fidelity—Third-Party Marketplace—"Streamline your workflow with integrations between Fidelity and third-party technology providers," https://clearingcustody.fidelity.com/app/item/RD_9883093/third-party-tools.html, pp. 1-11.

Huang et al., "An integrated software processor with autofilling out web forms," 2008 13th Asia-Pacific Computer Systems Architecture Conference, 2008, pp. 1-8 (Year: 2008).

Rofle, Alex, Barclays quick to embrace Open Banking with 3rd party account view in banking app, https://www.paymentscardsandmobile.com/barclays-quick-to-embrace-open-banking-with-3rd-party-account-view-in-banking-app/, pp. 1-4.

Huang et al., "An integrated software processor with autofilling out web forms," 2008, 13th Asia-Pacific Computer Systems Architecture Conference, 2008, pp. 1-8 (Year: 2018).

\* cited by examiner

SERVER-TO-DEVICE SECURE DATA EXCHANGE TRANSACTIONS

CROSS-REFERENCE TO RELATED APPLICATIONS

This application is a continuation of U.S. Provisional patent application Ser. No. 17/676,328 entitled "Dynamic Account Status Indicator Via Server-To-Device Secure Data Exchange," filed Feb. 21, 2022, which claims the benefit of and priority to U.S. Provisional Patent App. No. 63/181,861 entitled "Dynamic Account Status Indicator Via Server-To-Device Secure Data Exchange," filed Apr. 29, 2021, and also claims the benefit of and priority to U.S. Provisional Patent App. No. 63/152,581 entitled "Server-To-Device Secure Data Exchange," filed Feb. 23, 2021, each of which is incorporated herein by reference in its entirety.

TECHNICAL FIELD

The present disclosure relates generally to server-to-device secure data exchange. More specifically, aspects of the present disclosure relate to methods, systems and computer-readable media embodying computer-executable instructions for provisioning of dynamic account status indicators via server-to-device secure data exchange. In some arrangements, the dynamic account status indicators may be related to financial accounts.

BACKGROUND

Individuals use smart computing devices (e.g., smart phones, laptops, etc.) to access bank account information and perform banking activities. Individuals may also use applications provided by entities different from the bank to perform financial analytics, apply for loans, initiate automated fee disputes, etc. Such applications typically require authorization to access user data at a financial institution. Authorization typically includes a user name and password (or other credentials) provided by the user. The credentials are typically stored by the applications, which may compromise account security.

SUMMARY

Various embodiments described herein relate to systems, methods, and/or non-transitory computer-readable media structured to perform server-to-device secure data exchange using a device access token. In an embodiment, a smart device receives, from a requestor entity provided to the smart device, an account data provisioning request for an account. Based on the account data provisioning request, an account identifier for the account is determined. In some arrangements, the account identifier comprises or is associated with a device access token. Based on the device access token, a data element associated with the account is determined. In some embodiments, the data element is accessible to the requestor entity only if it is not access-restricted based on the device access token. Based on the data element, an executable graphic rendering instruction is generated. The executable graphic rendering instruction is executed, which includes generating and displaying, on a user interface of the smart device, a dynamic account status indicator relating to the account.

These and other features, together with the organization and manner of operation thereof, will become apparent from the following detailed description and the accompanying drawings.

DETAILED DESCRIPTION

Various embodiments described herein relate to systems, methods, and non-transitory computer-readable media structured to perform server-to-device secure data exchange using a device access token. As will be appreciated, the present disclosure provides various technical improvements and/or solves specific technical problems. For example, one of skill will recognize a technical problem of having multiple, different authentication protocols to a service provider computing system for each of the various applications provided to a smart device. Multiple authentication protocols expose both the applications and the provider computing system to security vulnerabilities, including code injection, user impersonation, interception of data in transit, interception of data at rest, etc. The present disclosure relates to one authentication protocol implemented by a component of a smart device for multiple (potentially unrelated) applications provided thereto. Furthermore, data can be provisioned to a particular smart device without being routed via computing entities that maintain the smart device and/or third-party computing applications installed on the smart device.

As another example, one of skill will recognize a technical problem of allowing various applications to communicate without user intervention. The present disclosure enables a smart device to engage in secure data exchange directly with a service provider computing system by automatically managing secure authenticated sessions and provisioning data via the use of tokens, APIs, and/or SDKs.

As another example, one of skill will recognize a technical problem of minimizing processing overhead and network bandwidth consumption associated with authenticated session creation and management. For example, applications that are required to provide login credentials every time they make a data request generate additional network traffic. The present disclosure enables on-demand data provisioning without requiring separate authentication each time a particular application requests data from a service provider computing system.

Figure 1:
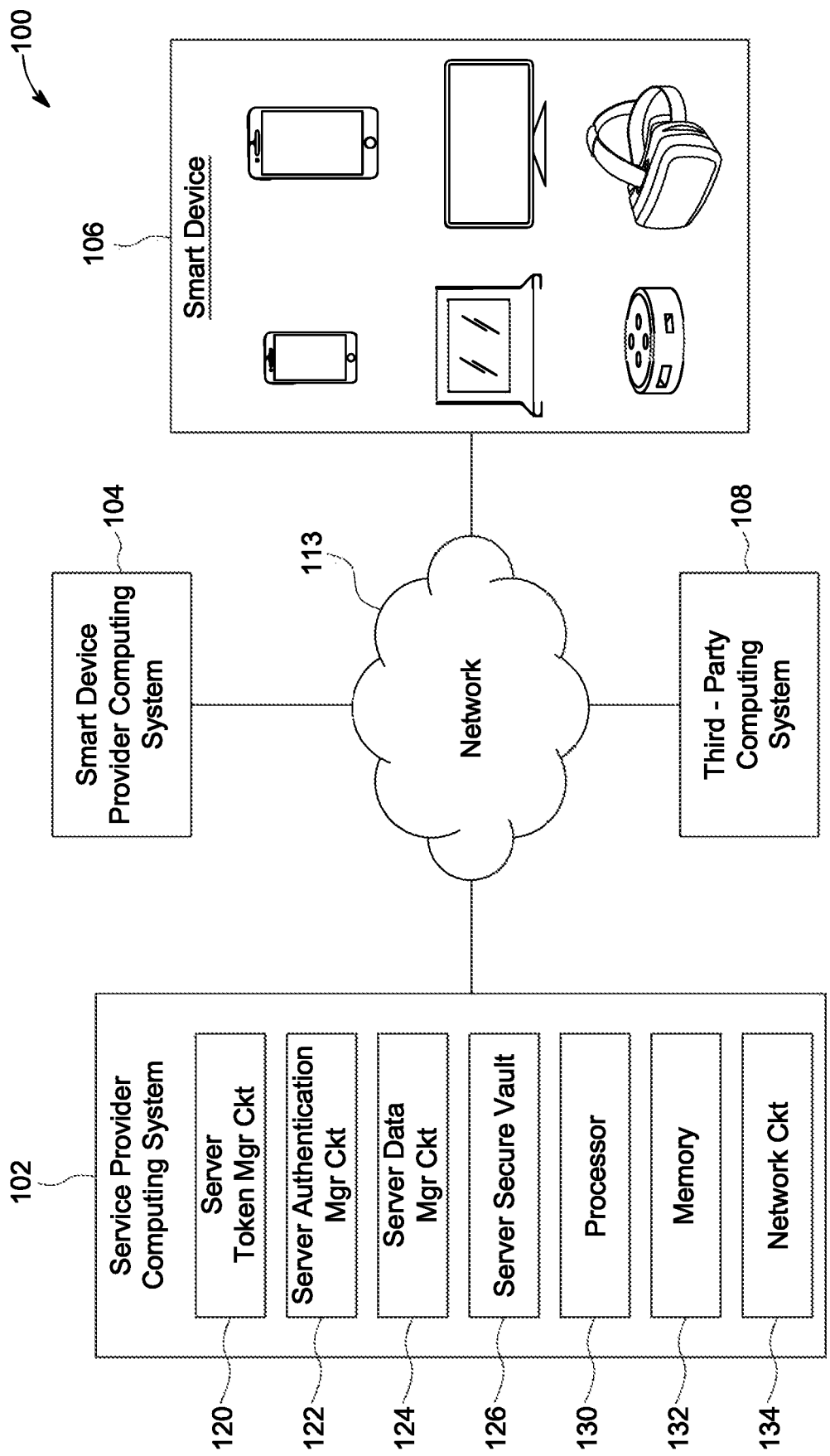
FIG. 1 is a block diagram of an example computer-implemented system structured to perform server-to-device secure data exchange, according to some arrangements.

Referring to FIG. 1, depicted is a block diagram of an example computer-implemented system 100 structured to perform server-to-device secure data exchange, according to some arrangements. In operation, the computer-implemented system 100 is structured to facilitate various secure data exchange operations (also referred to herein as "transactions"), such as data receipt, transmission, query, storage, analytics, etc.

As shown, the computer-implemented system 100 includes a service provider computing system 102, a smart device provider computing system 104, a smart device 106, and a third-party computing system 108. These systems are communicatively coupled to one another via the network 113, which enables the systems to electronically exchange data.

As a general overview, the service provider computing system 102 is structured to facilitate financial services provided by a financial institution to a user of the smart device 106. For example, the service provider computing system 102 can be managed and/or operated by a bank, credit union, insurance company, and the like. The user of the smart device 106 may have various financial accounts at the financial institution, such as a checking account, a savings account, a money market account, a mortgage or another loan account, a credit card account, etc.

The smart device 106 may include any suitable electronic device, such as a smart phone, a tablet, a laptop, a desktop, a smart TV, a virtual assistant (e.g., a virtual assistant embodied as a smart speaker), an immersive reality device (e.g., a headset), a smart watch, etc. The smart device 106 may be communicatively coupled to a smart device provider computing system 104. The smart device provider computing system 104 may be managed or operated by a manufacturer, vendor, and/or service provider that manufactures, distributes and/or services the smart device 106 (e.g., Apple®, Google®, Samsung®, etc.). The smart device provider computing system 104 may be structured to provide software, drivers, security services, and/or other device management items to the smart device 106 in order to maintain the operation and functionality of the smart device 106. In some arrangements, the smart device provider computing system 104 includes an app store, and a user may cause the smart device 106 to download applications therefrom. The applications may include third-party applications provided by the third-party computing system 108 (e.g., QuickBooks®, Yodlee®, etc.), as described further herein. As used herein, the term "third-party" refers to an entity that is separate and independent from the entity that operates the service provider computing system 102 and/or the smart device provider computing system 104.

In operation, the user of the smart device 106 may utilize the smart device 106 to access various services provided by the financial institution via the service provider computing system 102, as described further herein. Further, the user of the smart device 106 may allow third-party applications associated with the third-party computing system 108 to access, via a control circuit provided to the smart device 106, the user's account at the financial institution in order to retrieve historical data for analysis and/or aggregation and/or to perform other functions.

As shown, the service provider computing system 102 includes circuitry to support server-to-device secure data exchange operations, such as token management, authenticated session management, and/or secure server-to-device data transfer. The service provider computing system 102 is shown to include various special purpose circuits, such as server token manager circuit 120, server authentication manager circuit 122, and server data manager circuit 124. These circuits may retrievably store items, such as data, code, executable files, markup files, configuration files, tokens, and the like in a server secure vault 126.

The special purpose circuits (e.g., the server token manager circuit 120, server authentication manager circuit 122, and/or server data manager circuit 124) may include at least one processor 130 and memory 132. The processor 130 may be implemented as a general-purpose processor, an application specific integrated circuit (ASIC), one or more field programmable gate arrays (FPGAs), a digital signal processor (DSP), a group of processing components, or other suitable electronic processing components. The memory 132 may include one or more devices (e.g., RAM, ROM, Flash memory, hard disk storage) for storing data and/or computer code for completing and/or facilitating the various processes described herein. The memory 132 may include non-transient volatile memory, non-volatile memory, and non-transitory computer storage media. The memory 132 may include database components, object code components, script components, or any other type of information structure for supporting the various activities and information structures described herein. The memory 132 may be communicatively coupled to the processor 130 and include computer code or instructions for executing one or more processes described herein.

The server token manager circuit 120 is structured to execute computer-based operations for managing device access tokens in a server-to-device secure data exchange ecosystem. The computer-based operations may include device enrollment management, application enrollment management, token lifecycle management, token expiration, token validation, and the like.

As used herein, a "device access token" is structured to uniquely identify a particular smart device 106 to the service provider computing system 102, which enables an enrolled smart device 106 to securely send and receive data in a server-to-device secure data exchange ecosystem. A device access token may include a device identifier, a financial account identifier, a user identifier for the smart device provider computing system 104, an application identifier, a timestamp, and/or other elements sufficient to authenticate a device and/or an application. One or more elements of each of the device identifier, financial account identifier, user identifier, and/or application identifier may be included. A device identifier may include a model number, a serial number, a Wi-fi address (e.g., MAC address, Bluetooth device address), an international mobile equipment identifier (IMEI), a mobile equipment identifier (MEID), an integrated circuit card identifier (e.g., subscriber identification module (SIM) card identifier), etc. A financial account identifier may include a hash of a financial account number or an otherwise obscured financial account number in whole or in part. A user identifier may include, for example, a social networking handle, an e-mail address, a phone number, a user's user name for the service provider computing system 102, a user's user name for the smart device provider computing system 104, and/or a user's user name for the third-party computing system 108. An application identifier may include, in whole or in part, an application name, an application instance identifier, an installation and/or last update timestamp for a particular application instance, etc. In some arrangements, these items may be converted to a string and concatenated to form a device access token. In some arrangements, the device access token is a mark-up language file (e.g., an XML file) where each particular data element is identified by a unique tag. In some arrangements, the device access token is a quick response (QR) code or another machine-readable optical label displayable via a display screen of the smart device 106 (e.g., for troubleshooting, for sharing with secondary smart device(s) 106, etc.).

The server authentication manager circuit 122 is structured to execute computer-based operations for authenticating smart devices 106 in a server-to-device secure data exchange ecosystem. The server authentication manager circuit 122 may receive, from a particular smart device 106, an electronic message that includes a request for data access and a device access token. The server authentication manager circuit 122 may parse one or more device identifiers from the device access token. The server authentication manager circuit 122 may cross-reference the one or more device identifiers to the device identifier(s) previously stored in the server secure vault 126 in order to determine whether a particular device has been previously enrolled. The server authentication manager circuit 122 may compare various parsed items from the device access token to verify that a particular enrolled smart device 106 is not being spoofed (e.g., impersonated) by an unauthorized device. For example, the server authentication manager circuit 122 may parse a SIM card identifier and a MAC address or a Bluetooth device address from a device access token and determine that a device is unauthorized if a known SIM card identifier is accompanied by a new MAC address or a Bluetooth device address, likely indicative of the SIM card having been removed from a previously authorized smart device 106 and installed on a different device. In another example, the server authentication manager circuit 122 may parse, from the device access token or from Internet traffic information associated with the request (e.g., from a header, footer, payload, or metadata properties of the packets of data received at the service provider computing system 102 in connection with the request for data), the source network identifier and compare the identifier to a list of previously stored known access networks for a particular smart device 106. The network identifier can include an IP address, a subnet, a service set identifier (SSID) for a wireless network, or another suitable identifier. In yet another example, the service provider computing system 102 may receive a geographical location identifier (e.g., a set of coordinates) from the smart device 106 and may compare the geographical location identifier to a set of previously known locations for the smart device 106.

As part of authenticating a particular smart device 106, the server authentication manager circuit 122 may also receive (e.g., as part of a device access token, as a separate element in an electronic message, or in a separate electronic message) an application identifier for an application provided to the smart device 106. As used herein, the term "provided to" refers to an application that includes functionality accessible to a user via the smart device 106. In some arrangements, the application is installed on the smart device 106. In some arrangements, the application is executing on the smart device 106 (e.g., via a browser). In some arrangements, the application is accessible at the smart device 106 via an emulator or a similar application delivery framework (e.g., Citrix®, Azure®, etc.), and is installed on and/or executing on a remote computing system relative to the smart device 106. A particular application may have an associated set of access permissions and/or restrictions that allow the application to perform certain specific functions and/or access specific data provided by the service provider computing system 102. The server authentication manager circuit 122 may cross-reference the application identifier to the application identifier(s) and the corresponding restriction(s) previously stored in the server secure vault 126 in order to determine whether a particular application provided to the smart device 106 has been previously enrolled and before retrieving and transmitting the requested data back to the smart device 106 for use by the application.

As part of authenticating a particular smart device 106, the server authentication manager circuit 122 may perform lifecycle-related checks on the received device access token. For instance, the server authentication manager circuit 122 may access a timestamp (e.g., a token creation time, a token expiration time, a token last used time) previously stored in the server secure vault 126 to determine if the received device access token is valid and/or if the user of the smart device 106 needs to complete an additional authentication process. For example, if a predetermined amount of time (e.g., one day, seven days, thirty days, never before used, etc.) has passed since a particular device access token was last used, the server authentication manager circuit may generate and cause the smart device 106 to provide to the user (e.g., in a display form, in an audible form) a prompt requesting the user's login credentials, biometric information, and/or authorization to proceed.

As part of authenticating a particular smart device 106, the server authentication manager circuit 122 may work in concert with the smart device 106 to manage secure authorized sessions. A secure authorized session may establish time boundaries for processing a particular data request from an authenticated device. For example, the server authentication manager circuit 122 may receive, together or separately from the device access token, a session identifier for a secure authorized session established by the smart device 106 for the purpose of data transmission. If the server authentication manager circuit 122 is unable to validate the device access token and/or application, the server authentication manager circuit 122 may transmit an electronic message to the smart device 106. The electronic message may include the session identifier and instructions to the smart device 106 to terminate the secure authorized session. The authentication manager circuit 122 may also be structured to receive electronic messages from the smart device 106 indicating that a particular secure authenticated session has been terminated, in which case the requested data will not be transmitted to the smart device 106.

The server data manager circuit 124 is structured to execute computer-based operations for data provisioning to smart devices 106 in a server-to-device secure data exchange ecosystem. After a device access token is verified and as long as a secure authenticated session between the service provider computing system 102 and the smart device 106 is active, the server data manager circuit 124 may be structured to retrieve and/or provide the data requested by a particular smart device 106. The server data manager circuit 124 may also execute the requested functionality, such as initiate a dispute, request a fee waiver, disable a particular card, etc. Based on the application identifier, the service provider computing system 102 may also access and apply application-specific restrictions in the server secure vault 126, as discussed further herein.

To carry out its operations, server data manager circuit 124 may be structured to determine a financial account identifier of the user. In some arrangements, the server data manager circuit 124 may parse the financial account identifier from the data request message received from the smart device 106. In some arrangements, the server data manager circuit 124 may parse the financial account identifier from the device access token received from the smart device 106. To improve security of user data, the financial account identifier may be encoded for provisioning and storage by the smart device 106 by, for example, generating a hash of a financial account number or otherwise obscuring the financial account identifier in whole or in part. The server data manager circuit 124 may apply a decoding algorithm and/or cross-reference the received encoded financial account identifier to a list previously stored in the server secure vault 126 in order to determine the actual account identifier. In some arrangements, the server data manager circuit 124 may receive a user identifier for the smart device provider computing system 104 (e.g., Apple® ID, Google® user name, Samsung® ID, etc.) and determine the actual account identifier(s) for the user's financial account(s) based on the user identifier for the smart device provider computing system 104.

The service provider computing system 102 is communicatively coupled to the smart device provider computing system 104, smart device 106, and third-party computing system 108 via network 113. To communicate via the network 113, the service provider computing system 102 includes a network circuit 134. The network circuit 134 may be used to establish connections with other computing devices by way of the network 113. The network circuit 134 may include program logic that facilitates connection of the service provider computing system 102 to the network 113. In some arrangements, the network circuit 134 may include any combination of a wireless network transceiver (e.g., a cellular modem, a Bluetooth transceiver, a Wi-Fi transceiver) and/or a wired network transceiver (e.g., an Ethernet transceiver). For example, the network circuit 134 may include an Ethernet device such as an Ethernet card and machine-readable media such as an Ethernet driver configured to facilitate connections with the network 113. In some arrangements, the network circuit 134 includes the hardware and machine-readable media sufficient to support communication over multiple channels of data communication. Further, in some arrangements, the network circuit 134 includes cryptography capabilities to establish a secure or relatively secure communication session in which data communicated over the session is encrypted.

Although not shown in FIG. 1, it is understood that device provider computing system 104, smart device 106, and/or third-party computing system 108 may include network interfaces for long-, medium- or short-range communication substantially similar to the network circuit 134 as described above.

The network 113 may include a local area network (LAN), a wide area network (WAN), a telephone network, such as the Public Switched Telephone Network (PSTN), a wireless link, an intranet, the Internet, or combinations thereof. The network 113 can enable communication between various nodes. In some arrangements, data flows through the network 113 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 113 layered over an OSI layer-3 network protocol such as Internet Protocol (IP), e.g., IPv4 or IPV6. The network 113 is composed of various network devices (nodes) communicatively linked to form one or more data communication paths between participating devices. Each networked device includes at least one network interface for receiving and/or transmitting data, typically as one or more data packets. An illustrative network 113 is the Internet; however, other networks may be used. The network 113 may be an autonomous system (AS), i.e., a network that is operated under a consistent unified routing policy (or at least appears to from outside the AS network) and is generally managed by a single administrative entity (e.g., a system operator, administrator, or administrative group).

The network 113 may be composed of multiple connected sub-networks or AS networks, which may meet at one or more of: an intervening network (a transit network), a dual-homed gateway node, a point of presence (POP), an Internet exchange Point (IXP), and/or additional other network boundaries. The network 113 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 113 may be any combination of physical links (e.g., fiber optic, mesh, coaxial, twisted-pair such as Cat-5 or Cat-6, etc.) and/or wireless links (e.g., radio, satellite, microwave, etc.).

The network 113 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 113 can include short-range wireless links, e.g., via Wi-Fi, BLUETOOTH, BLE, or ZIGBEE, sometimes referred to as a personal area network (PAN) or mesh network. The network 113 may be public, private, or a combination of public and private networks. The network 113 may be any type and/or form of data network and/or communication network.

The network 113 can include a network interface controller that can manage data exchanges with devices in the network 113 via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip.

In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various arrangements, the network interface controller implements one or more network protocols such as Ethernet.

Figure 2:
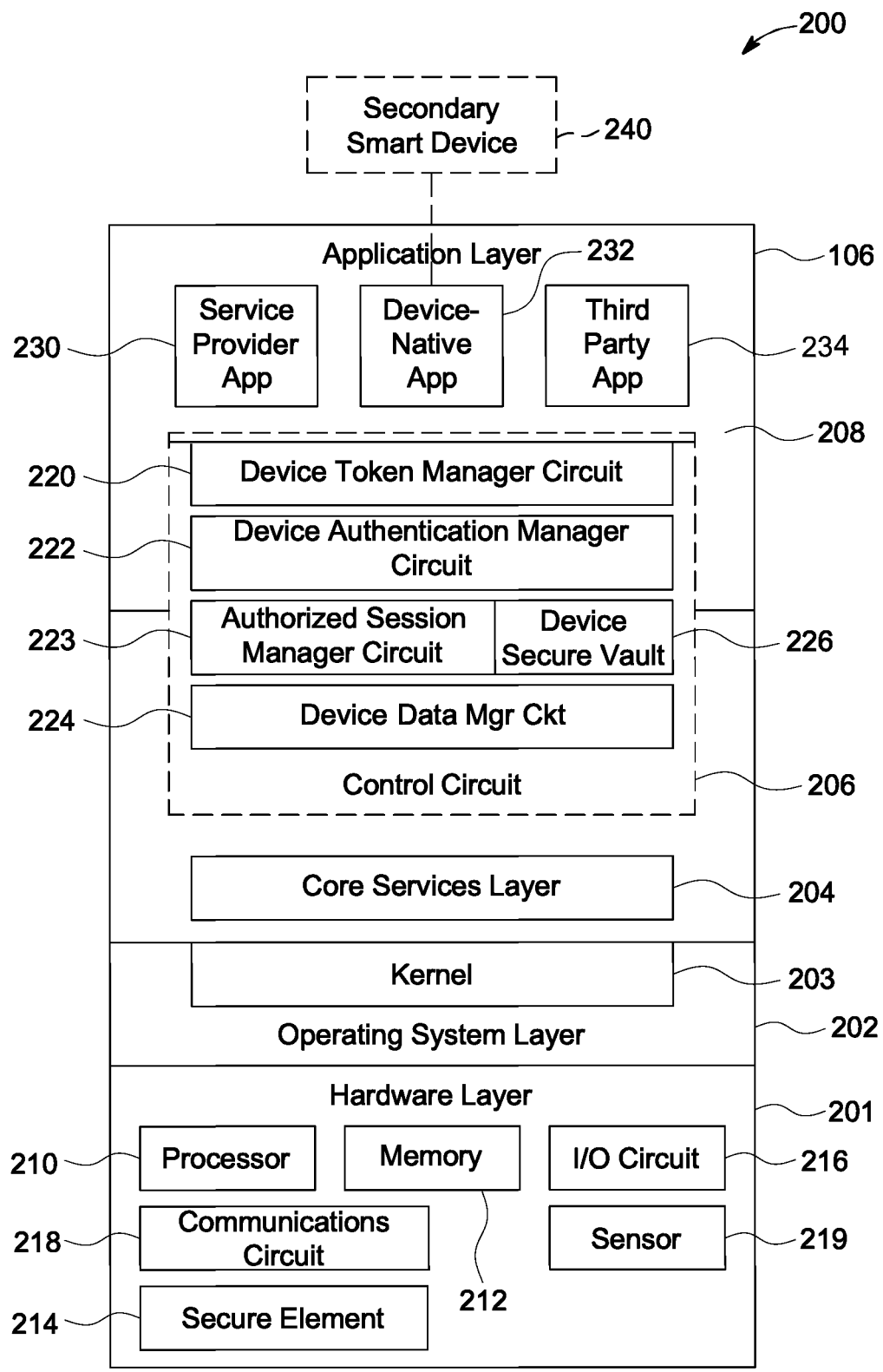
FIG. 2 is a block diagram of an example smart device structured to facilitate server-to-device secure data exchange, according to some arrangements.

Referring now to FIG. 2, depicted is a block diagram 200 of an example smart device 106 structured to facilitate server-to-device secure data exchange, according to some arrangements. In operation, the smart device 106 is structured to facilitate various secure data exchange operations, such as data receipt, transmission, query, storage, analytics, etc.

As shown in a simplified view, the smart device 106 includes hardware 201, operating system 202, and applications 208. The operating system 202 is shown to include a kernel 203, a core services circuit 204, and a control circuit 206. The control circuit 206 can be a special purpose circuit structured to facilitate server-to-device secure data exchange between the smart device 106 and/or a secondary smart device 240 and the service provider computing system 102 of FIG. 1. It is understood that the control circuit 206 may be implemented, in whole or in part, as part of the operating system 202 and/or as one or more of the applications 208. Further, the control circuit 206 may be structured to include various hardware 201 components described further herein.

As shown, hardware 201 includes a processor 210, memory 212, a secure element 214, an input/output (I/O) circuit 216, a communications circuit 218, and a sensor 219. The processor 210 may be implemented as a general-purpose processor, an application specific integrated circuit (ASIC), one or more field programmable gate arrays (FPGAs), a digital signal processor (DSP), a group of processing components, or other suitable electronic processing components. The memory 212 may include one or more devices (e.g., RAM, ROM, Flash memory, hard disk storage) for storing data and/or computer code for completing and/or facilitating the various processes described herein. The memory 212 may include non-transient volatile memory, non-volatile memory, and non-transitory computer storage media. The memory 212 may include database components, object code components, script components, or any other type of information structure for supporting the various activities and information structures described herein. The memory 212 may be communicatively coupled to the processor 210 and include computer code or instructions for executing one or more processes described herein.

In some arrangements, the memory 212 is included in, at least in part, or is communicatively coupled to the secure element 214. The secure element 214 can be a removable or built-in hardware and/or software circuit structured to securely store data and/or securely host applications 208 on the smart device 106. Further, in some arrangements, the secure element 214 may store executables for invocation by the various circuitry included in the core services circuit 204, control circuit 206, and/or applications 208. Further, in some arrangements, the secure element 214 may include a dedicated or shared memory space for execution of these various processes (e.g., by the kernel 203 and/or by the control circuit 206). The secure element can be implemented as an embedded computer chip, a removable SIM card, a system-on-a-chip (SoC), or similar. In some arrangements, the secure element 214 includes a co-processor additional to the processor 210. In some arrangements, the secure element 214 includes or is communicatively coupled to a near-field communications (NFC) controller, such as the communications circuit 218. More generally, the communications circuit 218 may include a transceiver suitable for short-, medium- or long-range communication, such as a wireless network transceiver (e.g., a cellular modem, a Bluetooth transceiver, a Wi-Fi transceiver, an NFC transceiver, etc.).

The I/O circuit 216 includes suitable input/output ports and/or uses an interconnect bus for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the I/O circuit 216 may provide an interface for the user to interact with various applications 208. For example, the I/O circuit 216 may include a keyboard, a keypad, a mouse, joystick, a touch screen, a microphone, a biometric device (e.g., a fingerprint sensor), a virtual reality headset, smart glasses, and the like. As another example, the I/O circuit 216 may include, but is not limited to, a television monitor, a computer monitor, a speaker, and so on. In some arrangements, the I/O circuit 216 includes a camera suitable for taking photographic images and/or scanning QR codes using the smart device 106.

The sensor 219 may include circuitry and/or a transceiver suitable for collecting and/or outputting various data. For example, the sensor 219 may be a global positioning system (GPS) transceiver configured to detect a geographical location (e.g., latitude and longitude) of smart device 106 in real or near-real time by using triangulation based on the coordinates of one or more cellular towers received by the smart device 106 via the communications circuit 218.

As shown, the operating system 202 includes a kernel 203, a core services circuit 204, and a control circuit 206. The kernel 203 is structured to work in conjunction with the core services circuit 204. Accordingly, the kernel 203 can include a dedicated space in the memory 212 for executing various processes managed by the core services circuit 204. These processes can include, for example, process management, file management, networking, user interface management, driver management for connected devices, and the like. The executables for these and similar services may be stored in the memory 212 and invoked, monitored, and terminated by the core services circuit 204. In some arrangements, the kernel 203 and/or the core cervices circuit 204 may include kernel extension executables for the control circuit 206 (i.e. the control circuit 206 may be included in the kernel 203 and/or the core cervices circuit 204 at least in part.)

The control circuit 206 is a special purpose circuit structured to facilitate server-to-device secure data exchange operations. In some arrangements, the control circuit 206 may receive requests and/or provide data to the applications 208. As shown, the applications 208 can include a service provider application 230, a device-native application 232, and a third-party application 234. The service provider application 230 may be, for example, a mobile banking application structured to exchange data with the service provider computing system 102. The service provider application 230 may include various functionality, such as account lookup, balance lookup, transaction history lookup, etc. for a financial account of a user. Accordingly, the information related to the financial account of the user may be accessible via the smart device 106. The device-native application 232 may be developed and/or provided to the smart device 106 by an operator of the smart device provider computing system 104, and may include an Internet browser, a camera control application, a telephone control application, an app store application, a control application for the secondary smart device 240, and the like. The third-party application 234 may be developed and/or provided by an operator of the third-party computing system 108. The third-party application may be independently downloaded by a user of the smart device 106 or may be provided via an app store application managed by the smart device provider computing system 104 (e.g., the device-native application 232). The third-party application 234 may be configured to access the user's account at the financial institution in order to retrieve historical data for analysis and/or aggregation and/or to perform other functions (e.g., automated fee disputes, underwriting, etc.).

Any of the applications 208 may be configured, via the control circuit 206, to access the user's financial data at the financial institution associated with the service provider computing system 102. As such, the technical problem of enhancing data security is solved by device-based authentication such that the control circuit 206 can bypass the smart device provider computing system 104 in providing data from the smart device 106 to applications 208 not managed by the financial institution (e.g., in providing data to the device-native application 232 and/or the third-party application 234) and/or to the secondary smart device 240. Furthermore, the server-to-device secure data exchange infrastructure managed by the control circuit 206 in concert with the service provider computing system 102 allows for minimization or significant reduction of the amount of private data (e.g., personally identifiable information (PII)) stored on the smart device 106. Furthermore, tokenization of confidential account information prevents the applications 208 from locally accessing and/or storing account identifiers of a user. As described further herein, account restrictions may further define the type of data, functionality, and/or data uses allowable for each application 208.

As shown, the control circuit 206 includes a device token manager circuit 220, a device authentication manager circuit 222, an authorized session manager circuit 223, a device data manager circuit 224, and a device secure vault 226. In operation, the control circuit 206 works in concert with the service provider computing system 102 to facilitate the enrollment of the smart device 106, secondary smart device 240, and/or particular applications 208 in the server-to-device secure data exchange ecosystem. Further, the control circuit 206 allows a user of the smart device 106 to provide authorized account access settings for the applications 208. Further, the control circuit 206 allows the applications 208 and/or the secondary smart device 240 to initiate transactions (e.g., data downloads, queries, funds transfer requests, etc.) from the smart device 106.

The device token manager circuit 220 is structured to execute computer-based operations for managing device access tokens in a server-to-device secure data exchange ecosystem. The computer-based operations may include device enrollment management, application enrollment management, token lifecycle management, token expiration, token validation, and the like, as described relative to FIG. 3-5.

The device authentication manager circuit 222 is structured to execute computer-based operations for authenticating smart devices 106 in a server-to-device secure data exchange ecosystem. The device authentication manager circuit 222 may receive, via a GUI rendered on the smart device 106, a smart device identifier.

In some arrangements, the smart device 106 is the device associated with the smart device identifier, and the user or an application 208 attempts to access and receive data at the smart device 106. In some arrangements, a first smart device 106 (e.g., a mobile device, a tablet, a laptop, a desktop, etc.) is a full-functionality device that includes the functionality of the control circuit 206 sufficient to perform the functions described herein. A secondary smart device 240 (e.g., a virtual assistant, a smart watch, an immersive reality device) may be designated by a user as an authorized device for receiving at least some of the data provided via server-to-device secure data exchange. The secondary smart device 240 may be associated with an application 208 (e.g., a fob issued by a financial institution may be associated with the service provider application 230, a virtual assistant device may be associated with a device-native application 232 that controls the virtual assistant device, and/or an internet-of-things device, such as a smart home component, may be associated with a third-party application 234, etc.). In this case, the device authentication manager circuit 222 may receive, at the smart device 106, a secondary device identifier related to the secondary smart device 240, and, upon prompting a user to approve a proposed secure data exchange transaction, may retrieve a corresponding token stored in the device secure vault 226 on a secure element 214. In some arrangements, the requesting application 208 is also identified, and the application identifier may be separately retrieved or may be included in a particular device access token.

After receiving a device identifier, the device authentication manager circuit 222 may generate and transmit the device access token and/or the application identifier to the server authentication manager circuit 122 of the service provider computing device 102, which may retrieve and provide the requested data. According to various embodiments, the device authentication manager circuit 222 and/or the server authentication manager circuit 122 may apply the relevant restrictions prior to providing the data to the requesting computing device and/or application 208.

As part of authenticating a particular smart device 106 or secondary smart device 240 for a particular data request, the authorized session manager circuit 223 may initiate and manage a secure authorized session (e.g., a secure time-limited communications session between the smart device 106 and the service provider computing device 102). The authorized session manager circuit 223 may generate a session identifier for a secure authorized session established by the smart device 106 for the purpose of data transmission between a requestor device (e.g., smart device 106) and/or requestor application 208 and the service provider computing device 102. In some arrangements, the secure authorized session is established after validating the request at the smart device 106 (e.g., after verifying that a device access token exists and is not expired, and that the applicable access restrictions are met). In some arrangements, only some or none of the foregoing operations are performed at the smart device 106, such that the server authentication manager circuit 122 performs further token validation, as described above, and causes the authorized session manager circuit 223 to terminate the secure communications session if the appropriate server-side checks performed by the service provider computing system 102 have failed.

As part of authenticating a particular smart device 106 or secondary smart device 240 for a particular data request, the authorized session manager circuit 223 may terminate a particular secure authorized session according to predetermined criteria. For example, a secure authorized session may be terminated at the smart device 106 if no response is received from the service provider computing system 102 within a predetermined amount of time (e.g., 15 sec., 30 sec., etc.), if the size of an inbound data transmission exceeds a predetermined threshold (e.g., 5 MB, 10 MB, etc.), if a user device enters inactive or shutdown mode, if a code injection attempt is detected as described below, etc.

The device data manager circuit 224 is structured to execute computer-based operations for data requests to the service provider computing system 102 from requestor application(s) 208 at the smart device 106. The device data manager circuit 224 may provide (e.g., access, retrieve from memory 212 and/or secure element 214) an API and/or SDK comprising executables for invocation by requestor application(s) 208. The executable(s) may be selectively tagged (e.g., in a configuration file implemented as a mark-up language file, such as XML, and stored in memory 212 and/or on secure element 214) with permission labels corresponding to restrictions. Accordingly, the device data manager circuit 224 may provide to the requestor application(s) 208 only the allowable executables for permissible (non-restricted) function calls. In some arrangements, the application(s) 208 include the appropriate parameters for the executables (e.g., "retrieve.exe" parametrized with an account identifier, amount(s), date range(s) for transactions to retrieve, etc.). In some arrangements, the device data manager circuit 224 receives the parameter arguments from the application(s) 208 and constructs the parametrized function calls in order to prevent errors in execution and minimize the possibilities for code injection. If a valid command is not detected or cannot be constructed, the device data manager circuit 224 may cause the authorized session manager circuit 223 to terminate the corresponding secure authenticated session.

The device data manager circuit 224 is structured to execute computer-based operations for data provisioning to requestor application(s) 208 at the smart device 106. The device data manager circuit 224 may receive the requested data from the service provider computing device, and may make the data available to the requestor application(s) 208. In some arrangements, when a requestor application 208 is an intermediary for processing data requests from the secondary smart device 240, the device data manager circuit 224 may transmit the requested data set directly to the secondary smart device 240, which may perform post-processing of the received data thereon and/or provide the results to the user.

Figure 3:
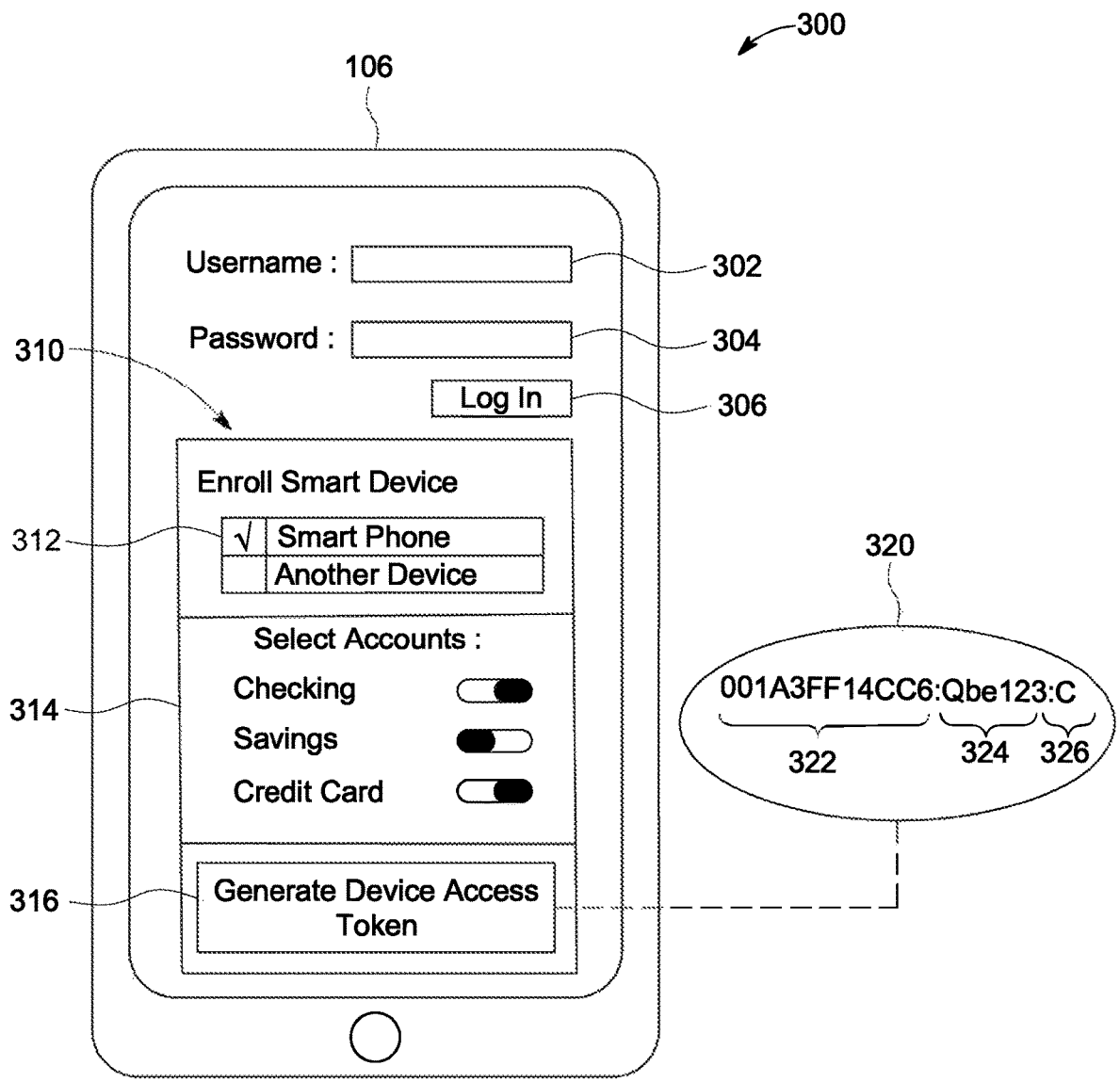
FIG. 3 is a component diagram of an example graphical user interface (GUI) of the smart device of FIG. 2, the GUI structured to facilitate smart device enrollment in server-to-device secure data exchange, according to some arrangements.

Referring now to FIG. 3, depicted is a component diagram of an example graphical user interface (GUI) 300 of the smart device 106 of FIG. 2, the GUI structured to facilitate smart device 106 enrollment in server-to-device secure data exchange, according to some arrangements. As shown, a user may provide login credentials (e.g., a user name 302 and a password 304) for the service provider computing system 102 via a data input control (e.g., a text box) of the GUI and then actuate the log in control 306 (e.g., a button). Upon receiving the login credentials, the service provider computing system 102 may transmit an electronic message to the smart device 106, causing the smart device 106 to generate and display an enroll smart device user interface 310. The enroll smart device user interface 310 provides a front-end to allow the user to interact with the control circuit 206 of the smart device 106. For example, a list of smart devices 312 may be generated and provided to the user. The list of smart devices 312 may include smart devices associated with the user, either previously enrolled or known to be associated with the user (e.g., by determining the secondary smart devices 240 locally paired to the smart device 106 via Bluetooth or similar, by scanning a QR code provided by a particular secondary smart device 240, by receiving and decoding an NFC token from a particular secondary smart device 240 at the smart device 106, etc.).

For each selected smart device 106 or secondary smart device 240 in the list of smart devices 312, the user can use the select accounts control 314 to specify financial accounts to which the selected smart device 106 or secondary smart device 240 should have access. Upon detecting a user interaction with a generate token control 316, the device token manager circuit 220 of the smart device 106 may generate a device access token 320 for the selected device and/or selected account. An example device access token 320 may include one or more device identifiers 322, financial account identifiers 324, and/or financial account type (checking, savings, credit card, etc.) identifiers 326, as shown. The device access token may be stored by the device token manager circuit 220 in device secure vault 226, which may be stored in the memory 212 and/or secure element 214 of the smart device 106.

Figure 4:
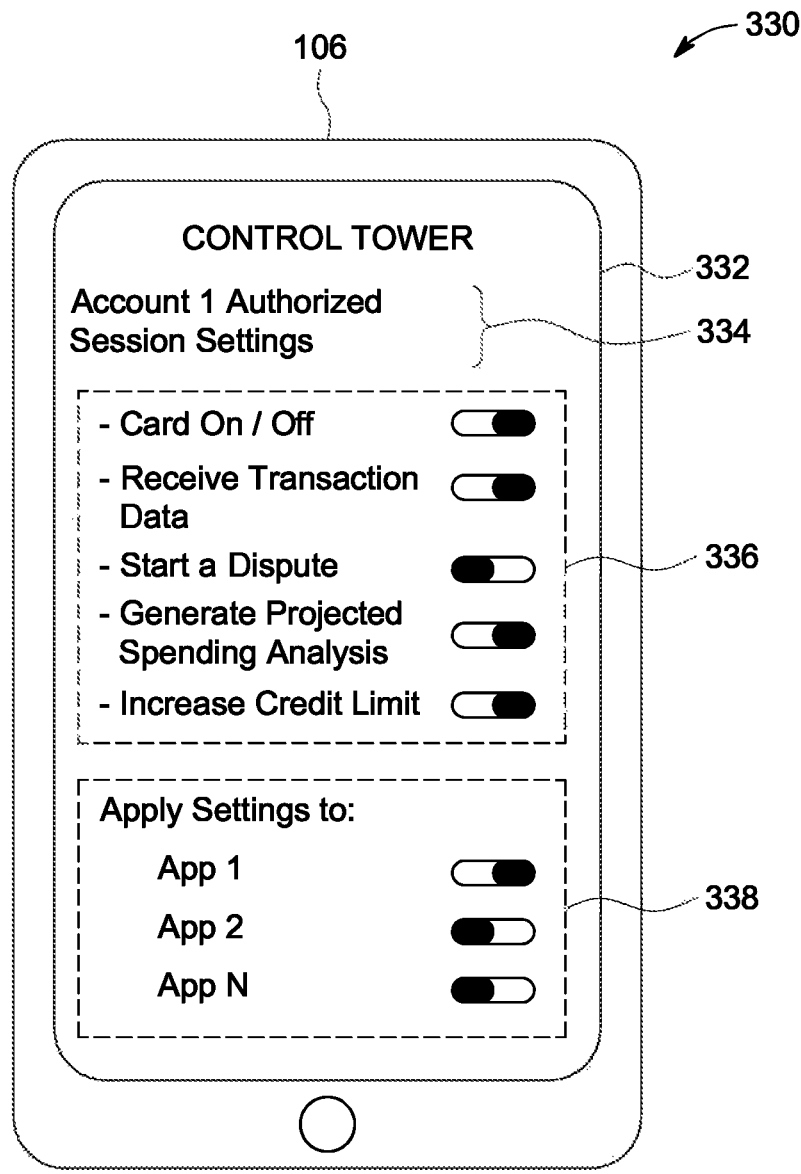
FIG. 4 is a component diagram of an example graphical user interface (GUI) of the smart device of FIG. 2, the GUI structured to allow a user to manage authorized account access settings on the smart device, according to some arrangements.

Referring now to FIG. 4, depicted is a component diagram of an example graphical user interface (GUI) 330 of the smart device 106 of FIG. 2, the GUI structured to allow a user to manage authorized account access settings via the smart device 106, according to some arrangements. The GUI 330 is structured to provide to a user a list of account-level restrictions 334 selectable and configurable to fine-tune the level of granularity in account access. For example, the user may utilize account restriction controls 336 to specify operations that are allowable for the control circuit 206 of the smart device 106 to initiate for users and/or third-party applications. The account restriction controls 336 may include, for example, whether a physical and/or virtual card associated with a particular account can be turned on/off (e.g., activated/deactivated for financial and/or non-financial transactions) using server-to-device authentication, whether specific transaction data can be received using server-to-device authentication, whether disputes can be automatically initiated using server-to-device authentication, etc. The application restriction controls 338 further allow users to apply different account restriction controls 336 to specific applications. For example, a user may allow a greater scope of functionality to the service provider application 230 relative to the third-party application 234. In another example, a user may allow a higher level of functionality if a particular application 208 is a trusted application. In some arrangements, the restrictions can be stored and applied locally on the smart device 106 before initiating a secure authorized session with the service provider computing system 102. In some arrangements, the restrictions can be stored and applied by the service provider computing system 102. In some arrangements, the restrictions can be included in device access tokens 320 and parsed from the device access tokens 320 before being applied. In some arrangements, the restrictions can be stored in a markup-language file and applied to select and/or parametrize only allowable function calls from an API or SDK library, which may be retrievably stored in the device secure vault 226 of the smart device 106, in the server secure vault 126 of the provider computing system 102, or in another suitable location.

Figure 5:
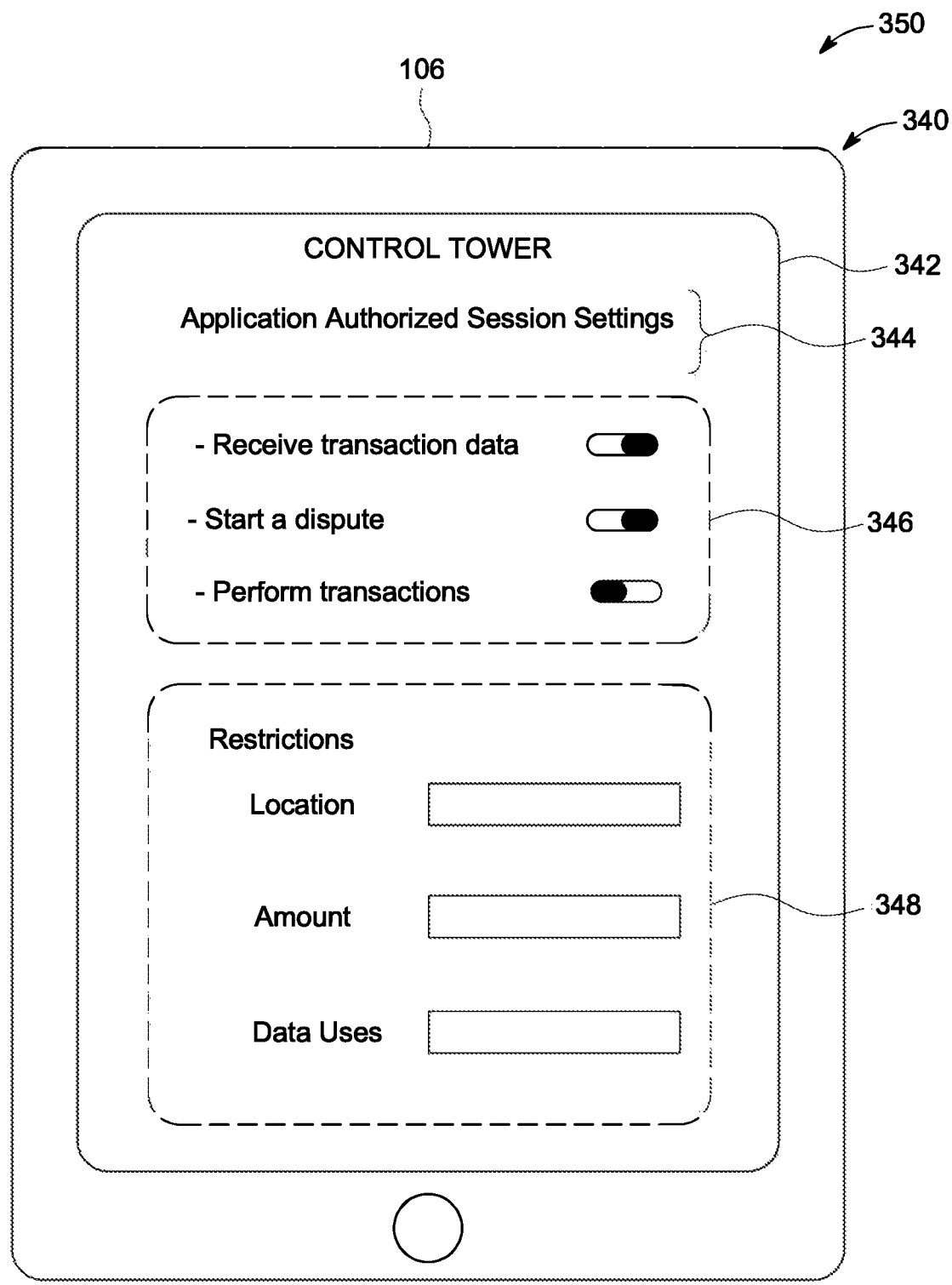
FIG. 5 is a component diagram of an example graphical user interface (GUI) of the smart device of FIG. 2, the GUI structured to allow a user to manage application settings for applications provided to the smart device, according to some arrangements.

Referring now to FIG. 5, depicted is a component diagram of an example graphical user interface (GUI) 340 of the smart device 106 of FIG. 2, the GUI structured to allow a user to manage application settings for applications 208 provided to the smart device 106, according to some arrangements.

As shown, the user can further restrict various applications 208 provided to the smart device 106 by defining specific restrictions 348 (access and/or data use levels) for each combination of a particular application 344 and account restriction controls 346. For example, the user may specify that a particular application 344 can receive transaction data (an example account restriction control 346) only when the sensor 219 (e.g., a GPS sensor) provides data to the smart device 106 and/or to the service provider computing system 102 that indicates that a user is within a predetermined radius of a predetermined geographical location, within a particular geofenced area, etc. In another example, the user may specify that a particular application 344 can receive transaction data (an example account restriction control 346) only for transactions that meet a particular threshold, fall in a particular date range, have a particular transaction descriptor, etc. In another example, the user may specify that a particular application 344 can receive transaction data (an example account restriction control 346) only for specific uses. For example, in some arrangements, an application 208 may be restricted from storing a data set, may be allowed to receive only summary data, may be allowed to receive only de-identified data that excludes PII, etc.

Figure 6:
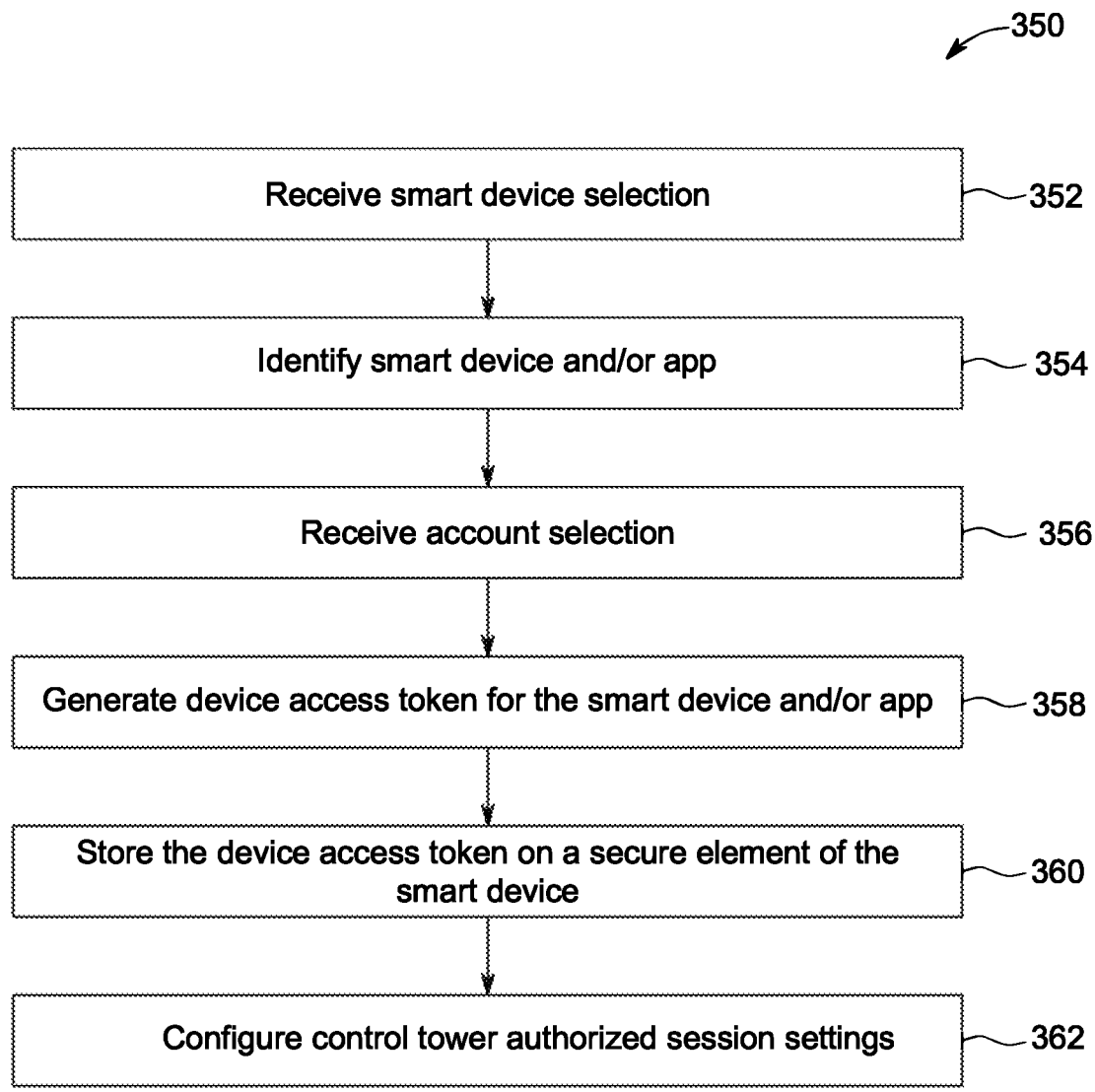
FIG. 6 is a flowchart of an example method to facilitate smart device and/or application enrollment in server-to-device secure data exchange, according to some arrangements.

Referring now to FIG. 6, depicted is a flowchart of an example method 350 to facilitate smart device 106 and/or application 208 enrollment in server-to-device secure data exchange, according to some arrangements. As a brief overview, the method 350 includes operations to enroll a smart device 106 and/or application 208 to securely send and receive data in a server-to-device secure data exchange ecosystem. The application 208 may be any of a service provider application 230, a device-native application 232, and/or a third-party application 234.

At 352, a smart device selection is received via a user interface provided on a display screen of the smart device 106. In some arrangements, the smart device selection refers to the smart device 106 (i.e., when the smart device 106 is initially enrolled in server-to-device data exchange). In some arrangements, the smart device selection refers to a secondary smart device 240, which the user is configuring for enrollment in the server-to-device data exchange ecosystem via a previously enrolled smart device 106. At 354, an additional selection of a specific application 208 may be received at the smart device 106. At 356, an additional selection of a specific financial account may be received at the smart device 106. At 358, a device access token is generated at the smart device 106 and/or at the service provider computing system 102. The device access token may include a device identifier, a financial account identifier, a user identifier for the smart device provider computing system 104, an application identifier, a timestamp, and/or other elements sufficient to authenticate a device and/or an application. At 360, the device access token is retrievably stored. In some arrangements, the device access token is retrievably stored in the device secure vault 226, which may be included in the memory 212 and/or secure element 214 of the smart device 106. In some arrangements, the device access token is retrievably stored in the server secure vault 126 of the service provider computing system 102. At 362, various user selections related to authorized account access settings and/or account restrictions, as described above, are received at the smart device 106. As described above, the authorized account access settings may be stored on the smart device 106 and/or on the service provider computing system 102.

Figure 7:
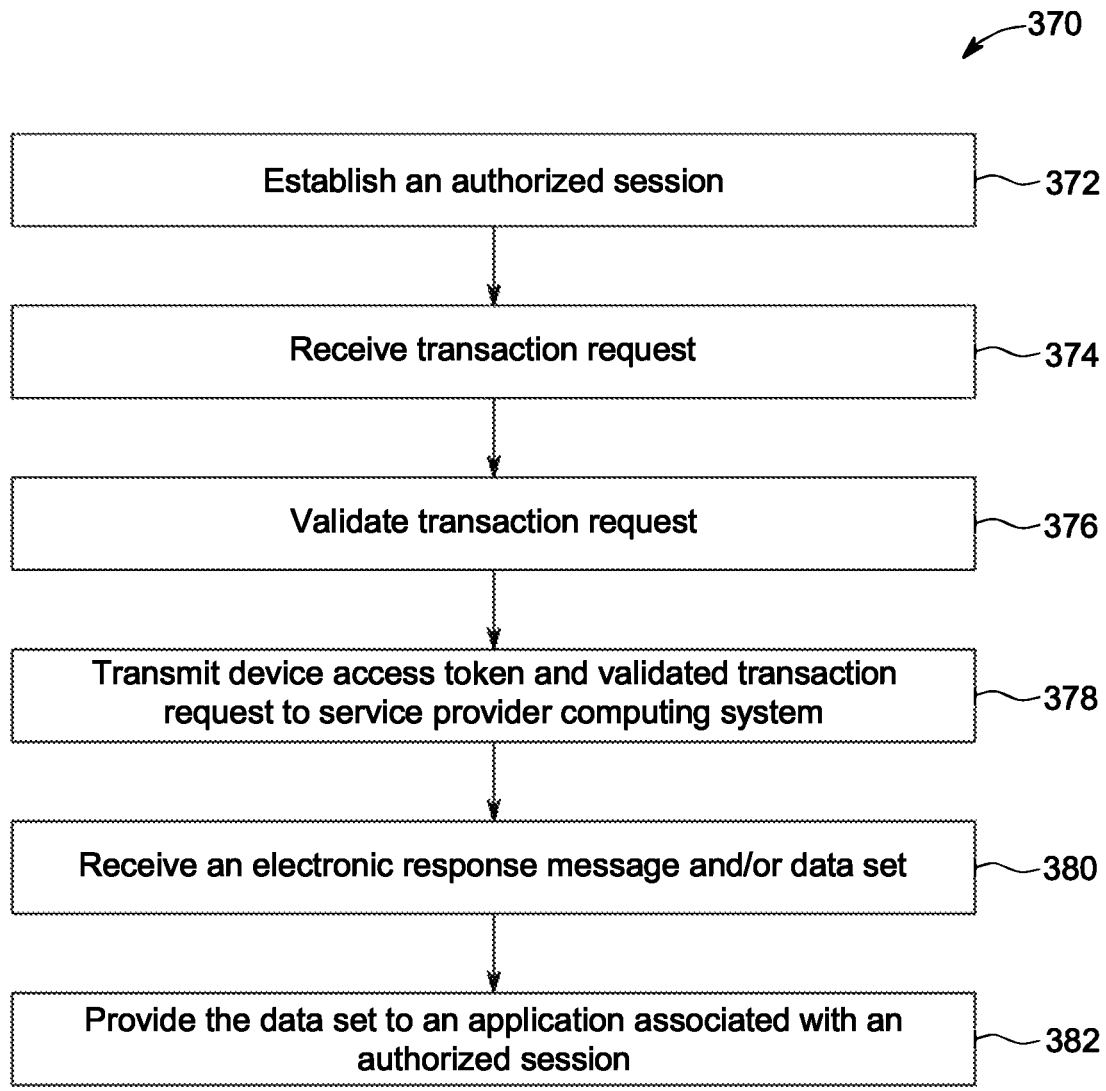
FIG. 7 is a flowchart of an example method to facilitate a transaction using the smart device in server-to-device secure data exchange, according to some arrangements.

Referring now to FIG. 7, depicted is a flowchart of an example method 370 to facilitate a transaction using the smart device 106 and/or a secondary smart device 240 in server-to-device secure data exchange, according to some arrangements. As a brief overview, the method 370 includes operations to allow a smart device 106 and/or the secondary smart device 240 to perform secure data exchange using a previously stored device access token. Any of the previously enrolled applications 208 (a service provider application 230, a device-native application 232, and/or a third-party application 234) may engage in server-to-device secure data exchange, subject to the appropriate restrictions set using the control circuit 206 of the smart device 106.

At 372, a secure authorized session between the smart device 106 and the service provider computing system is established as described relative to FIGS. 1 and 2. These operations may be performed contemporaneously or sequentially, in any suitable order, relative to receiving a transaction request from a particular application 208. For example, in some arrangements, an authorized secure session is automatically created for an active application 208 before said application 208 generates a request for a transaction. In some arrangements, an authorized secure session is created after the transaction request is received at the smart device 106 and/or after the transaction request is validated, at 376, at the smart device 106 and/or at the service provider computing system 102.

As part of validating the transaction request at 376, the smart device 106 may identify a requestor application 208 using an application name, an application instance identifier, an installation and/or last update timestamp for a particular application instance, etc. The smart device 106 may retrieve a previously stored device access token corresponding to the application 208 and verify that the token is valid (e.g., the token is not expired, the token was created after the installation and/or last update timestamp for the application 208, etc.). The smart device 106 may further retrieve previously stored restrictions associated with the application 208 and/or the device access token and apply the restrictions to the request and/or transmit the restrictions to the service provider computing system 102 for application of the restrictions. Applying the restrictions may include, for example, scrubbing (validating) and/or constructing allowable function calls using an API or SDK for performing the relevant transaction (e.g., for accessing the relevant data, for invoking the relevant functionality, etc.) Applying the restrictions may further include determining, based on the request, a specific account identifier associated with the transaction and validating that the account is on a list of specific accounts or subaccounts for which the requested transaction is allowed.

At 380, the smart device 106 receives an electronic response message from the service provider computing system 102. The response message may include a data set generated by the service provider computing system 102 in response to the request. At 382, the received data set is provided to the requestor application 208.

Figure 8:
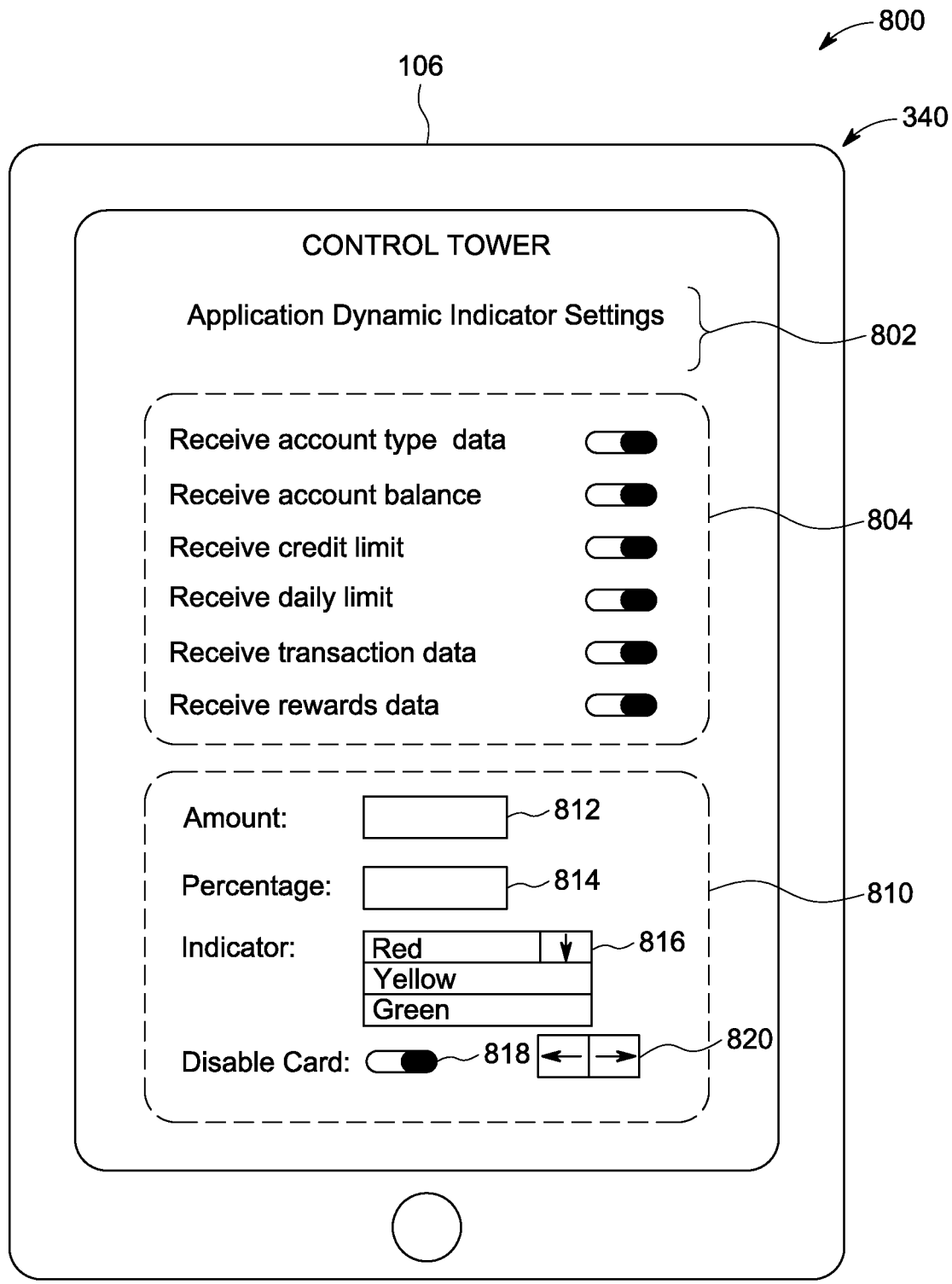
FIG. 8 is a component diagram of an example graphical user interface (GUI) of the smart device of FIG. 2, the GUI structured to allow a user to manage application settings for use of dynamic account status indicators with account data provisioning requests by applications provided to the smart device, according to some arrangements.

Referring now to FIG. 8, depicted is a component diagram of an example graphical user interface (GUI) 340 of the smart device 106 of FIG. 2. The GUI 340 is structured to allow a user to manage application settings 802 for use of dynamic account status indicators 816 with account data provisioning requests. As a general overview, dynamic account status indicators 816 may be associated with financial accounts and structured to enable differentiated dynamic presentation of account attributes to the user of the smart device 106 via the GUI 340. The differentiated dynamic presentation systems and methods described herein solve a technical problem of customizing account presentation based on confidential account-related data without providing the confidential account-related data to the requestor entity and/or by ensuring that the requestor entity has authorization to access the confidential account-related data on a particular smart device 106. According to various embodiments, the requestor entity may be a digital wallet application. In such embodiments, the dynamic account status indicators may cause a graphical representation of a payment account (e.g., a payment card image) to change (e.g., change color or design, change an opacity, change a shape, etc.) or have information or graphics overlaid on top of the representation (e.g., text overlaid on top of the payment card image).

Accordingly, one or more applications provided to the smart device 106 may include digital wallet features. For example, any of the service provider application 230, device-native application 232, or third party application 234 may be structured to allow the user of the smart device 106 to generate, manage, and/or use digital identities for the user's real-world financial accounts (e.g., a checking account, a savings account, a brokerage account, a credit card account, a rewards account, etc.). In some arrangements, such as when the service provider application 230 is a digital wallet application, the entity that provides, manages, or administers the financial account also provides, manages, or administers the digital wallet application. In some arrangements, such as when the device-native application 232 and/or third party application 234 is a digital wallet application, the entity that provides, manages, or administers the financial account is different from the entity that provides, manages, or administers the digital wallet application. For example, the operator of the device-native application 232 may also provide a pre-installed or downloadable device-native digital wallet application. In some arrangements, the device-native digital wallet application may be downloadable from the smart device provider computing system 104 via an app store provided by the operator of the smart device provider computing system 104. In another arrangement, the digital wallet application may be provided and/or downloadable from the third-party computing system 108.

The digital identities of the financial accounts may include various account attributes, such as account identifiers, account numbers, PIN code(s), login credentials, expiration dates, current balances, transaction history, credit limits, remaining available spend, daily cash withdrawal limits, daily purchase limits, card enabled/disabled indicators, reward points usage conditions, rewards points balances, geographical restrictions on use, etc. In some embodiments, the account attributes are replacement values used to obscure actual values, and a cross-reference structure that maps these values may be stored on or off the smart device 106. In some embodiments, the cross-reference structure may include one or more device access tokens generated for the account. In some embodiments, the account attributes are tokenized values generated, for example, as hashes of the respective actual values according to suitable hashing algorithms. In some embodiments, at least some attributes of the digital identities are stored in the memory 212 and/or on the secure element 214 of the smart device 106. In some embodiments, at least some attributes of the digital identities are stored remotely relative to the smart device 106—for example, on data storage media associated with the service provider computing system 102, such as the server secure vault 126.

Various attributes of digital identities may be used to enable differentiated dynamic presentation of account attributes to the user of the smart device 106 via the GUI 340. In an example use case, a quick glance indicator (also sometimes referred to as a dynamic account status indicator) may be associated with a digital identity of a financial account and rendered via the GUI 340. According to various embodiments, the quick glance indicator may comprise a card image or another graphics- and/or text-based informational representation entity rendered via the GUI 340. In some embodiments, the quick glance indicator may include one or more properties associated with account data and/or with the card image or another informational representation entity. The property may include a particular value or range of values for color and/or opacity such that, for example, when an account balance reaches a predetermined threshold, the color and/or opacity of the informational representation entity are set to a specified value. The property may include a particular value or range of values for location-specific use. For example, a particular card may be enabled or disabled for use in specified geographical locations, at specified merchants, etc. The property may further include a binary enabled/disabled indicator.

In an example arrangement of FIG. 8, the dynamic account status indicator settings 804, identified by the header 802, can be pre-defined by the service provider computing system 102. The control circuit 206 of the smart device 106 may retrieve the settings from the server secure vault 126 via a query, API call, SDK function call, or another suitable electronic data request message. The dynamic account status indicator settings 804 may be retrievably stored relative to identifier(s) or data regarding a particular requestor entity (e.g., relative to an application instance identifier for a digital wallet application).

Figure 9:
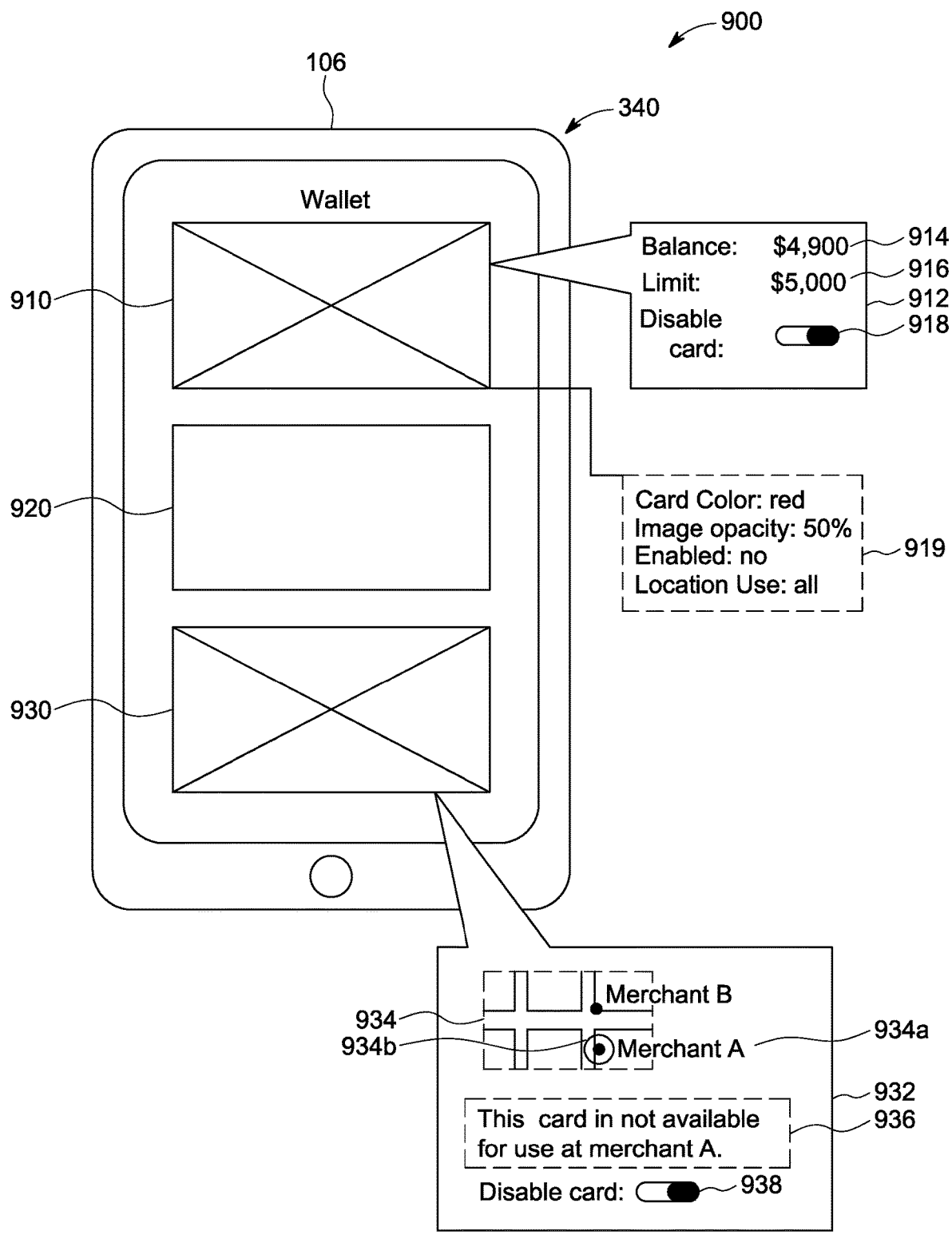
FIG. 9 is a component diagram of an example graphical user interface (GUI) of the smart device of FIG. 2, the GUI structured to facilitate account data provisioning operations using dynamic account status indicators, according to some arrangements.

The dynamic account status indicator settings 804 may be further editable by the user of the smart device 106. For example, as shown, the user may specify how various account data items (account type, balance, credit limit, daily limit, transaction data, rewards data, etc.) should be used to generate the quick glance indicator. For each item shown at 804, the user may further modify or define the criteria 810, such as the amount 812, percentage 814, indicator value 816, card status 818, etc. In an example use case, the user may, for example, specify that if an account balance is at or above the amount 812 (e.g., $4,800), the indicator value 816 is set to "red" and the card status 818 is set to "off" (e.g., disabled) such that the card cannot be used for further purchases. As a result, the quick glance indicator for the corresponding digital identity may include a displayable card image that is colored red and has an "X" over it to indicate that the card is not available for use, as shown in FIG. 9. The user may use the next control 820 to define another set of parameters—for example, if the account balance is at or above $3,000, the indicator value 816 is set to "yellow", if the account balance is at or below $1,000, the indicator value 816 is set to "green", etc. In some embodiments, the threshold amounts are evaluated relative to the credit limit if the account is a credit account. In some embodiments, the threshold amounts are evaluated relative to the available balance of funds if the account is a deposit account. Further, in various embodiments, percentage 814 thresholds defined relative to the daily limit, account balance, or the credit limit can be used instead or in addition to amount 812 thresholds. In some embodiments, the GUI 340 allows the user to navigate to an account management website or application provided by the service provider computing system 102. Accordingly, the user may define or modify the settings shown according to FIG. 8 via the banking website or application.

One of skill in the art will appreciate that the term "card", as used herein, may be used interchangeably with the term "account". Accordingly, the digital wallet application may include a digital identity for a virtual account that does not have a corresponding physical card.

In operation, the quick glance indicator is dynamically generated when a particular requestor entity provides a request for account data to the smart device 106. For example, the smart device 106 may receive an account data provisioning request from a digital wallet application when the user of the smart device 106 opens and/or activates the digital wallet application or attempts to perform a transaction. The request may include an actual or obscured account identifier. For example, the requestor entity may retrieve and include in the request a previously stored account identifier, which may be part of a digital identity for an account. The smart device 106 may determine a device access token based on the requestor entity and/or the account identifier. In some embodiments, the smart device 106 may parse the request into one or more data items (e.g., account balance, credit limit), verify, based on the device access token, that these data items are not access-restricted for the requestor entity, access retrievably stored dynamic account status indicator settings 804, retrieve the relevant data items, apply the dynamic account status indicator settings 804 to the data items, and generate a displayable quick glance indicator. The displayable quick glance indicator may be rendered on the smart device 106. In some embodiments, the data items are not persisted (not stored in non-volatile memory) on the smart device 106, which improves data security. Furthermore, once the displayable quick glance indicator is generated and rendered in response to a particular data request, the smart device 106 may be structured to clear its cache or otherwise discard the data from its transitory memory.

Referring now to FIG. 9, depicted is a component diagram of an example graphical user interface (GUI) 340 of the smart device 106 of FIG. 2. The GUI 340 is structured to facilitate account data provisioning operations using dynamic account status indicators, according to some arrangements. In some arrangements, the user may navigate to the GUI 340 from the display screen shown in FIG. 8. In some arrangements, the user may navigate to the GUI 340 by accessing the digital wallet application on the smart device 106. In some arrangements, the user may navigate to the GUI 340 when performing a financial transaction, for example, responsive to bringing the smart device 106 in proximity to a merchant's or another funds recipient's device, or more generally, the third-party computing system 108, and activating an NFC communications interface, a Bluetooth communications interface, or another suitable communications interface.

As shown according to an example embodiment, the GUI 340 is structured to include one or more informational representation entities that correspond to one or more digital identities of the user's accounts. In some embodiments, the one or more digital identities are accessible via a digital wallet application. As shown, in the example arrangement, the user of the smart device 106 has three accounts, each represented by a respective card image 910, 920, or 930. As shown according to an example embodiment, each of the card images 910, 920, or 930 is rendered as an image of a payment card; however, any suitable displayable entity comprising an image, text, and/or computer-executable instructions (e.g., navigation controls, data access controls, etc.) can be used.

As shown, an example card image 910 is associated with a dynamic account status indicator 919 and a navigable control structured to retrieve and display further information 912 and/or 932. In some embodiments, the dynamic account status indicator 919 may define a set of properties for the card image 910. The set of properties may be populated when the dynamic account status indicator 919 is generated. The dynamic account status indicator 919 may be programmatically bound to the card image 910 as an attribute, as a navigable reference (e.g., hyperlink) to a markup-language file (e.g., an XML file), or using another suitable method. In some embodiments, the dynamic account status indicator 919 is a record set retrieved responsive to a query, an API function call, and/or an SDK function call, or via another suitable electronic messaging interface. In some embodiments, the dynamic account status indicator 919 may exist only in volatile memory of the smart device 106.

In operation according to an example use case, the user accesses a digital wallet application on the smart device 106 via the GUI 340. The user is presented with a first card image 910 for a first account, a second card image 920 for a second account, and a third card image 930 for a third account. The user may wish to use one or more of the respective accounts to perform a funds transfer transaction (e.g., to make a purchase at a store).

As shown, the first account is disabled and unavailable for use. The user may tap, click or otherwise interact with the first card image 910 to activate a navigation control. The navigation control may be structured to provide further information 912 regarding the data items that caused the dynamic status indicator 919 to be generated for the first account. For example, as shown according to the dynamic status indicator 919, the user may have used the user interface of FIG. 8 to disable the account and set the color of the card image to red when the balance exceeds $4,800 relative to the credit limit. As shown according to further information 912, the user's current account balance 912 is $4,900 relative to the credit limit of $5,000. As shown, in some embodiments, the user may interact with the disable card control 918 to make the account available for use despite the restrictions.

To generate and render the first card image 910, when the user accesses the GUI 340 via the digital wallet application, the digital wallet application, also sometimes referred to as a requestor entity, generates a request for data sufficient to generate and render the first card image 910 for the user's account. The smart device 106 retrieves, from the secure element 214 or memory 212, a device access token based on the requestor entity and/or the account identifier included in the request. The smart device 106 accesses retrievably stored dynamic account status indicator settings (defined, for example, as described in reference to FIG. 8) for the user's account. The smart device 106 retrieves the relevant data items (here, the account balance 912 and account limit 914) and applies the dynamic account status indicator settings to the data items. Applying the settings to data items may include various suitable operations, such as value comparisons to thresholds, enabling or disabling accounts for use, enabling or disabling geographical restrictions, etc. Accordingly, the smart device 106 generates the dynamic status indicator 919.

Further, the smart device 106 may implement access controls for the data items, which may include confidential account-related information. For example, in some embodiments, the smart device 106 may verify, based on the device access token and according to the control settings described in relation to FIGS. 3-5, that the data items, such as the balance 914 and credit limit 916, are not access-restricted for the requestor entity. If not access-restricted, the smart device 106 may provide further information in an electronic response message directly to the requestor entity (e.g., the digital wallet application). If items are access-restricted, the smart device 106 may generate and display a pop-up message not accessible or modifiable by the requestor entity to show further information 912. Accordingly, in some embodiments, the requestor entity may be provided by the smart device 106 only with the dynamic status indicator 919, which may be sufficient to define the appearance of the card image 910 without revealing confidential account-related information.

As shown, the second account is enabled and available for use. The second account, corresponding to the second card image 920, may be selected by the user to complete the transaction. In some embodiments, the second account is automatically selected as a payment method for the transaction if other accounts are unavailable for use or are in a "yellow" or "red" state. More generally, the digital wallet application may be structured to automatically select, as a payment method, an account that is the best candidate for use relative to other accounts of the user (e.g., "green" vs. "yellow", "yellow" vs. "red", etc.).

As shown, the third account is disabled and unavailable for use. The user may tap, click or otherwise interact with the third card image 930 to activate a navigation control. The navigation control may be structured to provide further information 932. Here, in an example use case, further information 932 may include a digital map 934. The digital map 934 may include an indication of Merchant A location 934a and the user's current location 934b. The user's current location may correspond to the current location of the smart device 106 determined using a GPS transceiver or another type of sensor 219 associated with the smart device 106. The dynamic status indicator generated for the third account may include a location use restriction that prevents the third account from being used at Merchant A (e.g., if the smart device 106 is within a predetermined distance from Merchant A). Accordingly, further information 932 may include a notification 936 explaining why the third account is unavailable for use. Further information 932 may also include a disable card control 938, and, in some embodiments, the user may interact with the disable card control 918 to make the account available for use despite the restrictions.

Figure 10:
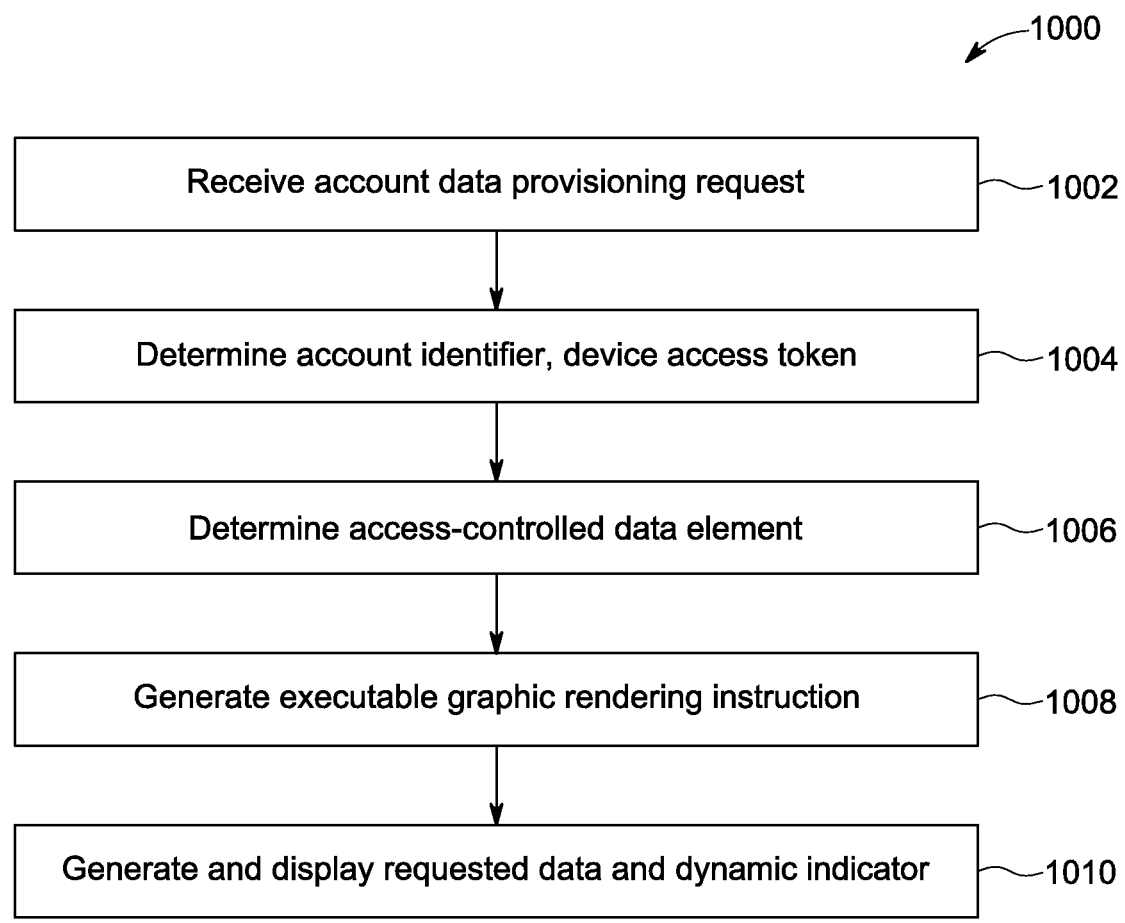
FIG. 10 is a flowchart of an example method to facilitate account data provisioning operations using dynamic account status indicators, according to some arrangements.

Referring now to FIG. 10, depicted is a flowchart of an example method 1000 to facilitate account data provisioning operations using dynamic account status indicators, according to some arrangements. As a brief overview, the method 1000 includes operations to enable a smart device 106 to facilitate the generation and rendering, on a user interface of the smart device 106, of account information according to a dynamic account status indicator. Example embodiments of dynamic account status indicators are described in relation to FIGS. 8 and 9. The operations of method 1000 may be performed by the service provider computing system 102, smart device provider computing system 104, smart device 106, and/or third-party computing system 108.

At 1002, the smart device 106 receives an account data provisioning request. The account data provisioning request may be generated by any of the service provider application 230, device-native application 232, or third-party application 234 provided to the smart device 106. The account data provisioning request may include an account identifier. In some embodiments, the account identifier is associated with a device access token. The device access token is unique to the smart device and/or a combination of a smart device, particular financial account of a user, and application instance identifier for the requestor entity (or another suitable identifier for the requestor entity, such as its associated computing system 102, 104 or 108). In some embodiments, the account identifier is a device access token. In some embodiments, the account identifier is an actual account identifier value of the financial account. In some embodiments, the account identifier obscures or replaces the actual account identifier. In some embodiments, the requestor entity is a digital wallet application and the account identifier is associated with the application and retrievably stored in the memory 212 of the smart device 106 and/or in memory associated with the requestor computing system, such as any of the systems 102, 104, or 106. In some embodiments, the account identifier is received by the requestor entity via a function call from an API or SDK library made available by the service provider computing system 102 to the requestor entity.

At 1004, the smart device 106 (e.g., the control circuit 206) may extract the account identifier from the electronic request message and, based on the extracted account identifier, determine the corresponding device access token. To determine the device access token, the smart device 106 may also extract from the electronic request message an application instance identifier for the application that generated the function call, or another suitable identifier for the requestor entity. An example device access token 320 is described in relation to FIG. 3. The device access token may be stored in the memory 212 and/or secure element 214 of the smart device 106. In some embodiments, the smart device 106 may tokenize and/or detokenize the account identifier and/or application instance identifier received from the requestor entity to generate values in a format consistent with that of the device access token. The smart device 106 may then retrieve the retrievably stored device access token, based on the received values, from the memory 212 and/or secure element 214.

At 1006, smart device 106 (e.g., the control circuit 206) may identify an access-controlled data element sufficient to generate a dynamic account status indicator. The smart device 106 may access (e.g., in the memory 212, secure element 214, and/or via a function call to the service provider computing system 102) the dynamic account status indicator settings 804, which may include the criteria 810 as described in relation to FIG. 8. The smart device 102 may determine, based on the retrieved settings and/or criteria, which confidential data elements associated with a user's financial account are needed to generate the dynamic account status indicator. For example, if the settings and/or criteria call for displaying a graphical representation of the account in a particular color based on the account balance, the corresponding confidential data elements may include the account balance.

The smart device 102 may determine, based on the device access token and the control restrictions described relative to FIGS. 3-5, whether the requestor entity is authorized to receive the confidential data element. If the requestor entity is authorized to receive the confidential data element, the smart device 106 may provide the data element to the requestor entity, and the operations 1008 and 1010 may be performed by the requestor entity at least in part. If the requestor entity is not authorized to receive the data element, the operations 1008 and 1010 may be performed by the control circuit 206. In some embodiments, however, the control circuit 206 may be structured to delegate some aspects of the operations 1008 and/or 1010 to the requestor entity if these aspects do not involve receiving confidential data by the requestor entity. For example, the control circuit 206 may generate parametrized function calls for rendering card images and provide the same to the requestor entity for execution on the smart device 106.

At 1008, the smart device 106 (e.g., the control circuit 206) may generate an executable graphic rendering instruction. In some embodiments, the executable graphic rendering instruction is a function call structured to generate the definitions for user interface elements of FIG. 9, such as the card image 910. As described in relation to FIG. 9, the card image 910 may have a dynamic account status indicator 919 associated therewith. The smart device 106 may populate the dynamic account status indicator 919 properties or data items with appropriate values determined based on the retrieved settings and/or criteria. For example, if the account balance indicates that a card should be shown in red (or otherwise marked to visually, audibly, or haptically indicate a restriction or a lack of a restriction such as, for example, sounding a particular tone or combination of tones corresponding to a particular alert level) and disabled for use, the smart device 106 may populate the relevant dynamic account status indicator 919 properties with appropriate values. Accordingly, the output of operations 1008 may include an executable instruction (e.g., an .exe file). The executable instruction may comprise a static or dynamic reference to a previously stored image file (e.g., a card image file) and the dynamic account status indicator 919 properties that customize the appearance and/or functionality of the previously stored image file. In some arrangements, the smart device 106 provides the executable instruction to the requestor entity for execution at 1010. As will be appreciated, in such arrangements, the executable instruction may not include any confidential account information but rather includes the dynamic account status indicator 919. In some arrangements, however, the smart device 106 may retrieve (e.g., via a function call to the service provider computing system 102) previously stored further information regarding the account and may provide the same to the requestor entity.

At 1010, the requestor entity generates and displays the requested card image modified according to the dynamic account status indicator 919. In some embodiments, the requestor entity executes the executable instruction received at 1008. In some embodiments, the executable instruction is a response to the function call made by the requestor entity at 1002. The output of the operations at 1010 may be a graphical user interface rendered on the smart device 106 and comprising at least one card image, such as the card image 910 shown in FIG. 9.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 6 NAND, NOR, 6 NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
receiving, by a first smart device via a first software application executing on the first smart device, a request to enroll a second smart device in a server-to-device secure data exchange ecosystem that allows multiple applications and/or smart devices to transact with a computing system of a service provider indirectly via the second smart device, wherein the second smart device is locally paired to the first smart device;
receiving, by the first smart device, a selection of a financial account held by the service provider;
responsive to receiving the selection of the financial account, generating, by the first smart device, a device access token based on (i) a device identifier corresponding to the second smart device, (ii) a financial account identifier corresponding to the financial account, and (iii) a user identifier corresponding to a user of the second smart device;
providing, by the first smart device, the device access token to the second smart device;
retrievably storing, by the second smart device, in a secure storage element of the second smart device, the device access token in association with an identifier of the first smart device;
receiving, the second smart device, a transaction request from a second software application executing on the second smart device;
based on the transaction request, (i) establishing, by the second smart device, a secure authorized session between the second smart device and the computing system of the service provider, and (ii) accessing, by the second smart device, the previously stored device access token;
transmitting, by the second smart device, to the computing system, via the secure authorized session, the device access token and the transaction request, wherein the transaction request causes the computing system to:
(i) parse the device identifier corresponding to the second smart device from the device access token, and
(ii) generate an electronic message based on the device identifier corresponding to the second smart device;
receiving, by the second smart device, from the computing system, via the secure authorized session, the electronic message responsive to the transaction request; and
providing, by the second smart device, to the second software application, a response to the transaction request based on the electronic message.

2. The method of claim 1, wherein at least one of the request or the selection is received via the first software application executing on the first smart device.

3. The method of claim 1, further comprising receiving, by the first smart device, an account restriction applicable to the second smart device or the second software application.

4. The method of claim 3, wherein the account restriction is received via the first software application.

5. The method of claim 3, further comprising applying, by the second smart device, the account restriction to the transaction request.

6. The method of claim 3, further comprising transmitting the account restriction to the computing system via the secure authorized session.

7. The method of claim 1, wherein the transaction request is a request for data.

8. The method of claim 1, further comprising receiving, by the second smart device, an account restriction applicable to the second smart device or the second software application.

9. The method of claim 8, wherein the account restriction is received via the second software application.

10. The method of claim 8, further comprising applying, by the second smart device, the account restriction to the transaction request.

11. The method of claim 1, wherein the response comprises the electronic message received from the computing system.

12. The method of claim 1, further comprising providing, by the second smart device, the electronic message to the first smart device.

* * * * *